United States Patent [19]

Senoo et al.

[11] 3,951,920
[45] Apr. 20, 1976

[54] PERMSELECTIVE POLYMERIC MEMBRANE PREPARED FROM POLYBENZIMIDAZOLES

[75] Inventors: Masao Senoo; Shigeyoshi Hara; Shuji Ozawa, all of Hino, Japan

[73] Assignee: Teijin Limited, Osaka, Japan

[22] Filed: Sept. 12, 1972

[21] Appl. No.: 288,389

[30] Foreign Application Priority Data
Sept. 13, 1971 Japan................................ 46-71550
Feb. 8, 1972 Japan.............................. 47-13801

[52] U.S. Cl.............................. 260/78 TF; 210/24; 260/30.2; 260/30.6 R; 260/30.8 R; 260/30.8 DS; 260/32.6 N; 260/47 CP; 260/49; 260/63 N; 260/65; 260/75 N; 260/77.5 R; 260/77.5 C; 260/78 A; 260/78 SC

[51] Int. Cl....................... C08g 33/02; C08g 33/04

[58] Field of Search............. 260/47 CP, 65, 78 TF, 260/78 A, 78 SC, 49, 63 N, 77.5 R, 77.5 C, 75 N

[56] References Cited
UNITED STATES PATENTS
3,647,762    3/1972    Hara et al............................ 260/78

*Primary Examiner*—Lester L. Lee
*Attorney, Agent, or Firm*—Sherman & Shalloway

[57] ABSTRACT

This invention provides a novel permselective polymeric membrane excellent in permselectivity which allows permeation of water in an aqueous solution at a high rate but is highly preventive of permeation of solutes, and a process for the preparation of such permselective membrane, said polymeric membrane consisting essentially of a linear polymer containing N-aryl-substituted-benzimidazole units as the main-chain-constituting units.

14 Claims, No Drawings

PERMSELECTIVE POLYMERIC MEMBRANE PREPARED FROM POLYBENZIMIDAZOLES

This invention relates to permselective polymeric membranes for the selective separation of fluid mixtures and a process for the production thereof. More particularly, this invention relates to permselective membranes composed of a linear polymer containing N-aryl-substituted-benzimidazole units, and to a process for the preparation of such permselective membranes.

It has long been known that specific components in a fluid mixture can be separated, purified or concentrated by the reverse osmosis method using a membrane or barrier having permselectivity.

Greater importance has recently been attached to the reverse osmosis method in preparation of pure water from sea water or brackish water or other impure waters or in treatment of waste water and drainages because of increasing demands for security of water resources and prevention of environmental pollution as well as because of its low-energy consumption.

The separation technique utilizing the permselectivity of such membranes has brought about great developments in the fields of dialysis, electrolytic dialysis and ultrafiltration with advance in research works made with a view to providing suitable substrates for such membranes and methods for the preparation of such membranes.

Quality of such permselective membrane is the most important factor in the separation technique utilizing a reverse-osmotic membrane, and in order to accomplish separation effectively with use of a membrane of this kind, it is indispensable that the membrane should have a characteristic permselectivity.

Namely, the membrane should possess such characteristic property that it allows a specific liquid medium in a fluid mixture to pass therethrough but it does not allow permeation of other components. When the separation is effected with use of such membrane, it needs to have mechanical strength high enough to survive high operation pressure and exhibit sufficiently practical permeation rate. Further, the membrane is required to have an ability to retain such desired properties for a long time. Namely, it is required that the membrane is chemically and physically stable for a long time under operation conditions.

With increase of importance of the reverse osmosis separation technique, extensive research works have been made on developments of substrates suitable for such membranes having desired properties, and various membrane substrates have been proposed.

However, these conventional membranes fail to exhibit high permeability or high desalinizing activity even if they are used for demineralization or desalination of sea water or brackish water, and their stability is not so high as to endure a long-time use when the operation is carried out on an industrial scale. Among conventional membranes, an asymmetric cellulose acetate membrane proposed by Loeb and Sourirajan (see the specification of U.S. Pat. No. 3,133,132) has been regarded as best. However a cellulose acetate membrane of this kind is readily hydrolyzed under acidic or alkaline conditions or by microorganisms or the like, resulting in degradation of the properties. Therefore, it has a limited operating life time. In addition to this fatal defect, various limitations are placed on its use. Thus, cellulose acetate membranes of this kind are still insufficient.

Recently, permselective membranes comprising as a substrate a nitrogen-containing polymer including a wholly aromatic polyamide or polyhydrazide have been proposed (see, for instance, the specification of U.S. Pat. No. 3,567,632).

Typical examples of nitrogen-containing polymers disclosed in this U.S. Pat. are, poly(metaphenylene isophthalamide-terephthalamide) copolymers and poly(isophthaloyl hydrazide). Although in this reference it is disclosed that benzimidazole ring may be contained in an aromatic polyamide chain, it is not taught at all that nitrogen-containing linear polymers containing N-aryl-substituted-benzimidazole units as the main-chain-constituting units would be usable as substrate polymers for permselective polymeric membranes.

It is a primary object of this invention to provide a permselective polymeric membrane excellent in permselectivity which allows permeation of water in an aqueous solution at a high rate but is highly preventive of permeation of solutes, and a process for the preparation of such permselective membrane.

Another object of this invention is to provide a permselective polymeric membrane which is excellent in not only such permselectivity as mentioned above but also such physical and chemical properties as strength, Young's modulus, chemical stability, and the like, and a process for the preparation of such permselective polymeric membrane.

Still another object of this invention is to provide a permselective polymeric membrane which retains excellent permselectivity for a long time under operation conditions and which can be readily prepared from a substrate, and a process for the preparation of such permselective polymeric membrane.

Further objects and advantages of this invention will be apparent from the following detailed description.

As a result of our research, it has now been found that the above objects and advantages can be attained by a permselective polymeric membrane consisting essentially of a linear polymer containing as the main structural units N-aryl-substituted-benzimidazole units;

1. said linear polymer being composed of the recurring units expressed by following general formula (1)

$$-(A,B)- \qquad (1)$$

wherein a. A is a divalent atomic group expressed by following general formula (2)

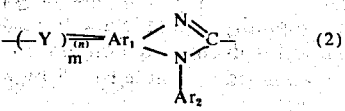

in which $m$ and $(n)$ are zero or 1, the two nitrogen atoms are bonded to two adjacent nuclear carbon atoms of the radical $Ar_1$, and $Ar_2$ is a monovalent aromatic group having up to 15 carbon atoms, and in which (i) when $(n)$ is zero, $Ar_1$ stands for a trivalent aromatic radical having up to 15 carbon atoms, Y is at least one member selected from the group consisting of —CONH—, —CONHNHCO—, —NHCONH—, and

and when Y is —CONH— or

Ar₁ may be bonded to either of the nitrogen and carbon atoms of Y; (ii) when (n) is 1, (n) indicates a single bond, Ar₁ is a tetravalent aromatic radical having up to 15 carbon atoms, and Y is an atomic group expressed by following formula (3)

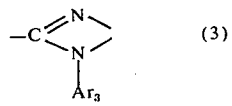

the two nitrogen atoms are bonded to the two adjacent nuclear carbon atoms of the aromatic radical Ar₁, and Ar₃ stands for a monovalent aromatic group having up to 15 carbon atoms; and (iii) the divalent atomic group expressed by above formula (2) is bonded in the polymer in either of the left and right directions;

b. B stand for a single bond or a divalent organic radical in which the average number of atoms exclusive of hydrogen atoms is not greater than 80 and carbon atoms are located at both the terminal ends, and when B is a single bond, the recurring unit A consists of the atomic group expressed by above formula (2);

2. the parameter (Hp) of hyrophilic property, expressed by the following formula, of said linear polymer is at least 0.4

$$Hp = \frac{N_H + 10N_I}{\text{total number of atoms exclusive of hydrogen atoms in the polymer}} \quad (4)$$

wherein $N_N$ is the number of hydrogen-bonding units contributed by polar groups in the entire polymer and is expressed by the product of the number ($N_A$) of hydrogen-bonding groups in the entire polymer and their hydrogen-bonding strength ($G_V$); and $N_I$ is the number of ionic groups in the entire polymer, with the proviso that the number of ionic groups does not exceed 1 per 500 of the molecular weight of the polymer;

3. the solubility a 25°C. of the linear polymer in a solvent composed of at least one member selected from the group consisting of N,N-dimethylacetamide, N-methylpyrrolidone, dimethylsulfoxide and hexamethylphosphoramide (which solvent may contain up to 5% by weight of lithium chloride), is at least 7% by weight; and 4. the linear polymer has a molecular weight sufficient to form a film.

To sum up, the permselective polymeric membrane of this invention is composed of a linear polymer containing as the main structural units N-aryl-substituted-benzimidazole units, said linear polymer meeting the following four requirements:

1. said linear polymer contains as the main structural units N-aryl-substituted-benzimidazole units expressed by the above formula (2), namely the following formula (2-a)

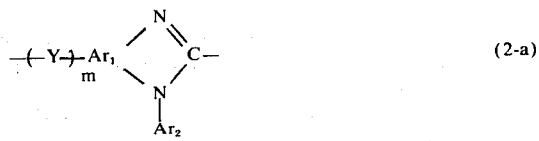

wherein m is 0 or 1, or the following formula (2-b)

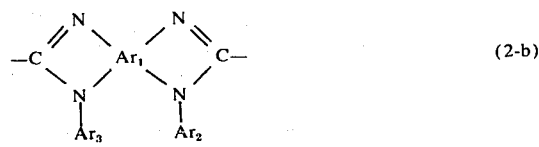

2. the above-defined parameter (Hp) of hydrophilic property of said linear polymer is at least 0.4, preferably at least 0.5;

3. said linear polymer has a certain degree of solubility (at least 7% by weight) in a solvent composed of at least one member selected from the group consisting of dimethylacetamide, N-methylpyrrolidone, dimethylsulfoxide and hexamethylphosphoramide (which may contain lithium chloride as a dissolving assistant in an amount not exceeding 5% by weight); and 4. said linear polymer has a molecular weight sufficient to form a film.

Above requirements [1] to [4] that the permselective polymeric membrane of this invention should meet will now be detailed:

1. Structure of Substrate Polymer

As described above, the substrate polymer of the permselective polymeric membrane is composed of the recurring units of the following formula

and it is not necessary that A and B should be alternating but B may be bonded to a group of a plurality of A's, e.g., from several to scores of A's, or it is permissible that the number of B is zero and the polymer is composed of A units alone. In short, A is an atomic group having the N-aryl-substituted structure expressed by the above formula (2), namely the above formula (2-a) or (2-b), and B is a bonding unit to connect atomic groups of A to one another.

As explained above, the above formula (2) may be rewritten as follows:

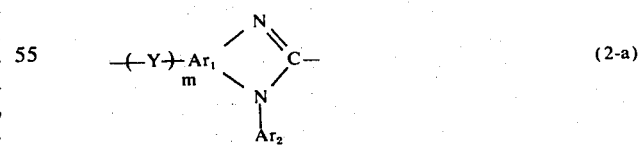

or

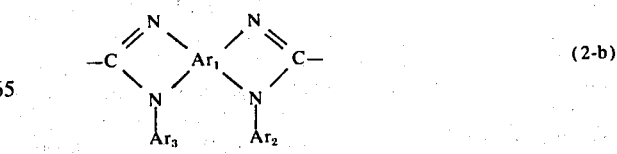

When *m* in the above formula (2-a) is 1, the formula (2-a) is expressed as follows:

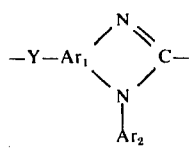 (2a-1)

and when *m* is 0 (zero), the formula (2-a) is expressed as follows:

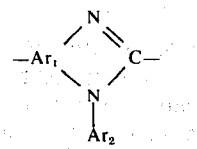 (2a-2)

Accordingly, the divalent atomic group A of the formula (2) may be expressed by either of above formulae (2a-11), 12a-2) and (2-b).

In these formulae (2-a) and (2-b) or (2a-1), (2a-2) and (2-b), $Ar_1$ stands for a tri- or tetra-valent aromatic group, and $Ar_2$ and $Ar_3$ stand for a monovalent aromatic group, each of these aromatic groups $Ar_1$, $Ar_2$ and $Ar_3$ having up to 15 carbon atoms. Further, these aromatic groups may be substituted by such substituents as lower alkyl groups, lower alkoxy groups, halogen atoms, nitro groups, sulfonic groups, carboxylic groups, lower alkoxy carbonyl groups or salts of these acid groups.

Y on the above formula (2-a) or (2a-1) may be any member selected from the groups expressed by the following formulae —CONH— (or —NHOC—),
—CONHNHOC—,
—NHCONH— and

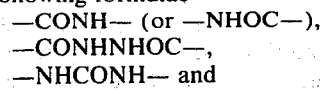

and the number of the group Y contained in the unit A is not particularly critical but one of Y, or two or more of Y's may be contained in the unit A.

Further, atomic groups A expressed by above formulae (2-a) and (2-b) need not be of the same kind, but two or more kinds of A's may be contained in the polymer chain. Moreover, the units A of above formula (2-a) or (2-b) may be present in the form reverse to that shown in formula (2-a) or (2-b).

As mentioned above, B may be either a single bond or a chain bonding the structural units A. The unit B may be any of divalent organic radicals, as far as its average number of atoms inclusive of hydrogen atoms in the entire polymer is not greater than 80.

It is preferred that the substrate polymer contains as units A at least one kind of radical expressed by the following formulae

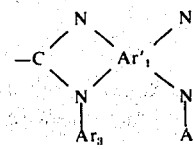 (2-1)

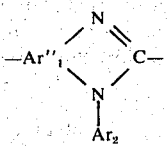 (2-2)

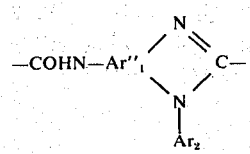 (2-3)

and

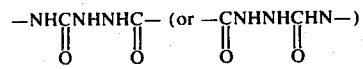 (2-4)

wherein $Ar'_1$ and $Ar''_2$ stand for a group expressed by the following formula

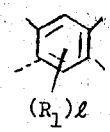 (5-a)

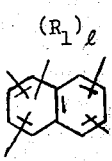 (5-b)

or

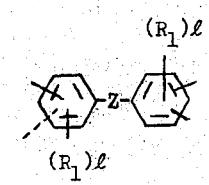 (5-c)

in which $R_1$ stands for a hydrogen or halogen atom or a lower alkyl or lower alkoxy group having 1 to 3 carbon atoms, *l* is 1 or 2, and Z designates a single bond or an alkylene group of up to 4 carbon aatoms, —O—, —S—, —$SO_2$— or —CO— and when Z is a single bond, the formula (5-c) expresses a tri- or tetra-valent biphenyl group, and "...." on the aromatic group designates a single bond in the case of $Ar'_1$ and a hydrogen atom or a substituent $R_1$ in the case of $Ar''_1$.

As regards the units B, it is preferred that the substrate polymer comprises as the units B (1) at least one kind of divalent orgaic groups selected from (i) aromatic hydrocarbon residues composed of a benzene or naphthalene nucleus, (ii) aliphatic hydrocarbon residues composed of a cyclohexane, cyclopentane or cyclobutane nucleus, (iii) straight or branched, saturated or unsaturated hyrocarbon residues having 1 to 6 carbon atoms (iv) 5- or 6-membered heterocyclic residues containing oxygen, nitrogen or sulfur, which may be fused with a benzene nucleus, carbon atoms being located at both the terminal ends in said divalent organic groups; or (2) (a) at least one kind of di-, tri- or tetravalent organic groups in which carbon atoms are located at both the terminal ends which are selected from (i) to (iv) above and (b) said organic groups are bonded with at least one kind of bonding groups selected from —O—, —S—, —SO$_2$—, —CO—,

(in which R is a hydrogen atom, an alkyl group of 1 to 3 carbon atoms or a phenyl group), —COHN—, —CONHNHOC—,

—CONHNHCOHN— and

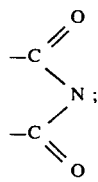

said atomic groups (1) and (2) may be substituted by a lower alkyl group of 1 to 4 carbon atoms, a lower alkoxy group of 1 to 4 carbon atoms, a halogen atom, a nitro group, a sulfonic or carboxyl group, a salt of said acid residue, a lower alkoxy carbonyl group, a primary, secondary or tertiary amino group, an ammonium salt thereof, or a quaternary ammonium base; and in the units B contained in the entire polymer, the average number of atoms exclusive of hydrogen atoms is not greater than 80, preferably not greater than 50.

As the substrate polymer are especially preferred (I) polymers in which the units A are at least one divalent group expressed by the following formula (6)

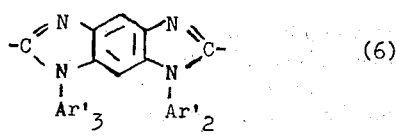

wherein Ar'$_2$ and Ar'$_3$, which may be the same or different, represent a monovalent aromatic group of up to 15 carbon atoms expressed by the formula

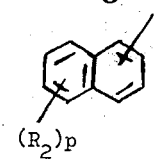

or

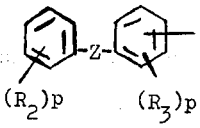

in which R$_2$ and R$_3$, which may be the same or different, represent a hydrogen atom, an alkyl group of 1 to 3 carbon atoms, a halogen atom, a nitro group, a sulfonic or carboxylic group or a salt thereof, p is 1 or 2, and Z is as defined with respect to the above formula (5-c), and the units B are at least one divalent organic group expressed by the following formula (7)

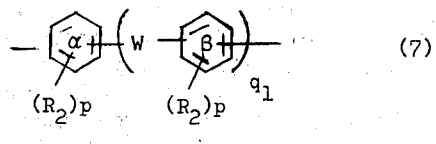

wherein q$_1$ represents an average content of the units

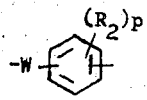

contained in the polymer and is a value of 0.2 to 3 moles per mole of the recurring units A, R$_2$ and p are as defined above with respect to the formula (6-1), and W is —CONH— (which may be located in the reverse direction), —O—, —SO—,

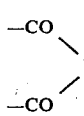

(in this case, the α or β ring is trivalent), —CONHNHOC—, an alkylene group of 1 to 4 carbon atoms or

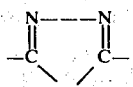

in which X designates —O—, —S—, —NH—, or

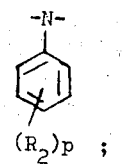

(II) polymers in which the units A are at least one divalent atomic group expressed by the following formula

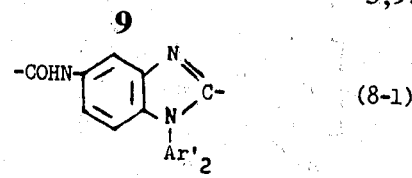

(8-1)

or

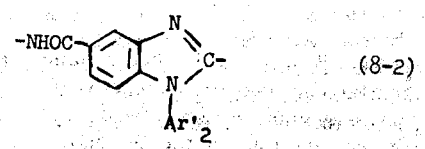

(8-2)

wherein Ar'$_2$ is as defined above with respect to the above formula (6), and the units B are at least one atomic group expressed by the following formula (9)

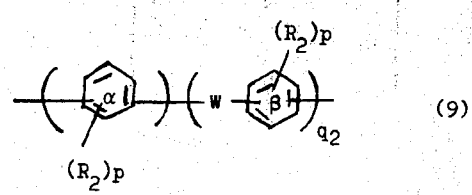

(9)

wherein $q_2$ designates the average content of the units

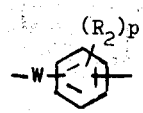

and is a value of 0 to 3 moles per mole of the recurring units A, and R$_2$, p and W are as defined above with respect to the formulae (6) and (7); and (III) polymers in which the units A are at least one atomic group expressed by the following formula (10)

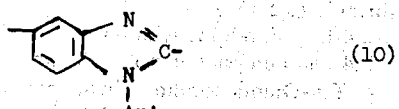

(10)

wherein Ar'$_2$ is as defined above with respect to the formula (6), and the units B are at least one atomic group expressed by the following formula (11)

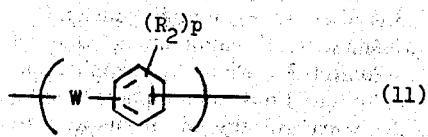

(11)

wherein $q_2$, R$_2$, p and W are as defined above with respect to the formula (9).

2. Hydrophilic Property

The substrate polymer to be used in this invention, which has the above-mentioned structure, should have the hydrophilic parameter (Hp) of at least 0.4, preferably at least 0.5. Polymers having a hydrophilic parameter (Hp) of at least 0.55 are especially preferred in this invention.

As mentioned above, the parameter (Hp) of hydrophilic property can be calculated from the following formula (4)

$$Hp = \frac{N_H + 10N_I}{\text{total number of atoms exclusive of hydrogen atoms in the polymer}} \quad (4)$$

It is known in the art that in order for a polymer to be useful as a substrate of a permselective polymer, it should possess hydrophilic property to some extent. Parameters $N_H$ and $N_I$ to be used for calculating the parameter (Hp) of hydrophilic property according to the formula (4) are illustrated in, for instance, the following references:

A. Gordy, Stanford, "Journal of Chemical Physics", Vol. 9, pages 204 – 214 (March 1941), and B. Specification of U.S. Pat. No. Pb 3,567,632.

As is seen from the above formula (4), the hydrophilic parameter (Hp) of the polymer is expressed in terms of the ratio of the sum of (i) the hydrogen-bonding strength based on various polar groups contained in the substrate polymer and (ii) the number of ionic groups contained in the substrate polymer to the number of atoms exclusive of hydrogen atoms in the substrate polymer.

Thus, in the formula (4) it is defined that $N_H$ is the number of hydrogen-bonding units contributed by polar groups in the entire polymer and is expressed by the product of the number of hydrogen-bonding groups ($N_A$) in the entire polymer and their hydrogen-bonding strength ($G_V$), and $N_I$ is the number of ionic groups in the entire polymer, with the proviso that the number of ionic groups does not exceed 1 per 500 of the molecular weight of the polymer.

Methods for calculating values of $N_A$, $G_V$ and $N_H$ are detailedly described in above-quoted references A) and B). Table 1 illustrates values of $N_A$, $G_V$ and $N_H$ of typical polar groups.

Table 1

| Polar Groups | $N_V$ | $G_V$ | $N_H$ |
| --- | --- | --- | --- |
| ketone, aliphatic-aromatic ether and diaromatic ether | 1 | 2 | 2 |
| dialiphatic ether | 1 | 4 | 4 |
| amino, substituted amino and hydroxyl | 1 | 6 | 6 |
| ester, sulfone and sulfoxide | 1.5 | 2 | 3 |
| amide | 1.5 | 4 | 6 |
| imidazole | 1.5 | 6 | 9 |
| oxadiazole | 2 | 4 | 8 |

The number of ionic groups in the entire polymer, i.e., the $N_I$ value, can readily be calculated from monomeric substances to be used for preparation of the substrate polymer. Typical instances of ionic groups to be contained in the substrate polymer of the permselective membrane of this invention include —SO$_3$H, —SO$_3$Me (in which Me is an alkali metal or alkaline earth metal), —COOH, —COOMe (Me is as defined above), an ammonium salt and a quaternary ammonium salt. It is preferred that the number of such ionic groups is 1 or less than 1 per 500 of the molecular weight of the substrate polymer.

3. Solubility

It is essential that the substrate polymer of the permselective polymer of this invention should meet the requirement that the solublity at 25°C. in a solvent composed of at least one member selected from the group consisting of N,N-dimethylacetamide, N-methylpyrrolidone, dimethylsulfoxide and hexamethylphosphoramide (said solvent may contain lithium chloride in an amount not exceeding 5%) is at least 7% by weight. It is preferred that the substrate polymer has a value of said solubility of at least 10% by weight.

It is not necessary for the substrate polymer to have a value of said solublity of at least 7% by weight with respect to all of these four solvents, but it is sufficient that the polymer has a value of said solubility of at least 7% by weight with respect to any one of the foregoing four solvents. Furthermore, such solvent may comprise as a dissolving assistant lithium chloride in an amount not exceeding 5% by weight.

4. Average Molecular Weight

The substrate polymer of the permselective membrane of this invention should have an average weight (an average degree of polymerization) sufficient to form a film. For this requirement, it is preferred that the substrate polymer has an inherent viscosity $\eta_{inh}$, as measured at 30°C. in a solution of the polymer in N-methylpyrrolidone at a concentration of 0.5 g/100 ml, of at least 0.4, especially at least 0.6.

Methods of preparing substrate polymers meeting above requirements [1] to [4] will now be illustrated.

5. Preparation of Substrate Polymer

Substrate polymers to be used in this invention, which contain N-aryl-substituted-benzimidazole units, may be prepared by, for instance, the method previously proposed by us, namely, the method disclosed in the specification of U.S. Pat. No. 3,518,234 (the specification of British Pat. No. 1,236,211).

This method of preparing substrate polymers will be outlined below.

An aromatic triamine or tetramine expressed by the formula

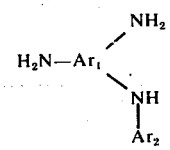

(12-1)

or

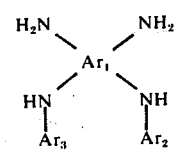

(12-2)

wherein $Ar_1$, $Ar_2$ and $Ar_3$ are as defined above with respect to the above formula (2), is reacted with (a-1) an aliphatic, alicyclic, aromatic or heterocyclic dicarboxylic acid or a reactive derivative thereof, thereby to form a polyamideimine having, for instance, recurring units expressed by the formula

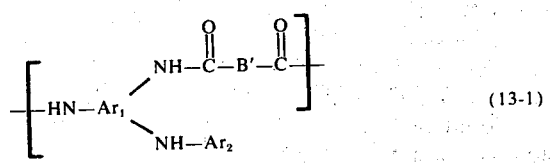

(13-1)

or

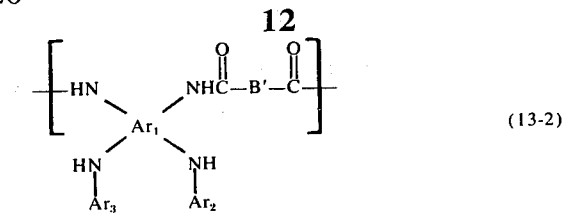

(13-2)

wherein B' is a hydrocarbon residue derived from said dicarboxylic acid or its reactive derivative, and this polyamideimine is subjected to cyclodehydration by, for instance, treating the polyamideimine with an acid or heating it, thereby to form an N-aryl-substituted polybenzimidazole consisting of the recurring units expressed by the following formula

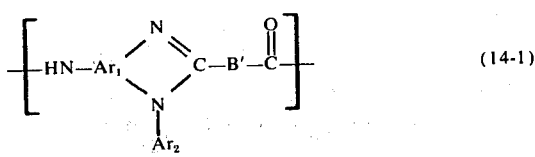

(14-1)

or

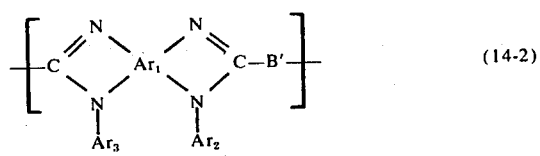

(14-2)

wherein $Ar_1$, $Ar_2$, $Ar_3$ and B' are as defined above.

Preferable examples of the N-aryl-substituted aromatic triamine or tetramine of the above formula (12-1) or (12-2) to be used for forming structural units A of the substrate polymer of this invention are illustrated below.

N-aryl-substituted aromatic triamines of the above formula (12-1):

2,4-Diaminodiphenylamine
2,4-Diaminophenylnaphthylamine
4-(2,4-Diaminoanilino)-benzophenone
4-(2,4-Diaminoanilino)-diphenylether
4-(2,4-Diaminoanilino)-biphenyl
1-Anilino-2,4-diaminonaphthalene
2-Anilino-1,5-diaminonaphthalene
4-Anilino-3,4'-diaminodiphenyl
2-Anilino-3,5-diaminodiphenyl
3-Anilino-4,6-diaminodiphenylether
4-Anilino-3,3'-diaminodiphenyl-sulfone
4-Anilino-3,3'-diaminobenzophenone
3-Anilino-4,6-diaminodiphenyl-methane 2. N-aryl-substituted aromatic tetramines of the above formula (12-2):

1,3-Dianilino-4,6-diaminobenzene
1,3-Di-p-toluidino-4,6-diaminobenzene
1,3-Bis-(p-chloroanilino)-4,6-diaminobenzene
4,4'-Dianilino-3,3'-dianilinodiphenyl
2,6-Dianilino-1,5-diaminonaphthalene
2,2'-Bis-(4-anilino-3-aminophenyl)-propane
4,4'-Dianilino-3,3'-diaminodiphenylether
4,4'-Dianilino-3,3'-diaminodiphenyl-sulfone
4,4'-Dianilino-3,3'-diaminobenzophenone Preferable examples of the dicarboxylic acid or its reactive derivative to be reacted with an N-aryl-substituted aromatic triamine or tetramine such as exemplified above are illustrated below.

i-a. Aromatic dicarboxylic acids:
Terephthalic acid
Isophthalic acid
2,6- or 1,5-Naphthalene dicarboxylic acid
3,3'- or 4,4'-Diphenyl dicarboxylic acid
3,3'- or 4,4'-Diphenylmethane dicarboxylic acid
3,3'- or 4,4'-Diphenylether dicarboxylic acid
3,3'- or 4,4'-Diphenylsulfone dicarboxylic acid
3,3'- or 4,4'-Diphenyl-(2,2-propane) dicarboxylic acid
3,3'- or 4,4'-Benzophenone dicarboxylic acid
i-b. Alicyclic dicarboxylic acids:
1,2-Cyclohexane dicarboxylic acid
1,4-Cyclohexane dicarboxylic acid
1,3-Cyclopentane dicarboxylic acid
1,3-Cyclobutane dicarboxylic acid
i-c. Aliphatic dicarboxylic acids:
Oxalic acid
Succinic acid
Adipic acid
Fumaric acid
i-d. Oxygen-, nitrogen- or sulfur-containing, 5- or 6-membered heterocyclic dicarboxylic acids:
2,4- or 2,5-Pyridine dicarboxylic acid
2,4- or 2,5-Furan dicarboxylic acid
2,4- or 2,5-Thiophene dicarboxylic acid
i.e. Reactive derivatives of dicarboxylic acis (i-a) to (i-d):
Halogenides, especially chlorides, lower alkyl esters and phenyl esters of the above dicarboxylic acids of (i-a) to (i-d) are used as reactive derivatives thereof. Acid chlorides are generally preferred as reactive derivatives, and use of aromatic dicarboxylic acid chlorides is especially preferred.

In preparing above polyamideimines by reacting an aromatic N-aryl-substituted triamine or tetramine such as exemplified above with a dicarboxylic acid or a reactive derivative thereof such as exemplified above, when a polyfunctional compound such as mentioned below is present in the reaction system, the substrate polymer in the form copolymerized with such polyfunctional compound component may be obtained. As such polyfunctional compound, there may be exemplified (a) aminocarboxylic acids, tricarboxylic monoanhydrides, tetracarboxylic dianhydrides and their respective derivatives, (b) diamines, hydrazines, aminohydrazides and aminodihydrazides, (c) dihydroxyl compound and aminohydroxyl compounds, and (d) diisocyanates and masked diisocyanates. When copolymerized polyamideimines formed by effecting the reaction between the aromatic N-aryl-substituted triamine or tetramine with the dicarboxylic acid or its reactive derivative in the presence of a polyfunctional compound such as mentioned above is subjected to the cyclodehydration, there can be formed a substrate polymer of the copolymer type comprising the structural units A and B.

Thus, the aromatic triamine or tetramine expressed by the above formula (12-1) or (12-2) forms the main portion of the structural unit A of the substrate polymer to be used in this invention, and the dicarboxylic acid component of (i-a) to (i-e) and the polyfunctional compound component of (a) to (d) form the main portion of the structural unit B of the substrate polymer. In this case, each of the amine component, the dicarboxylic acid component and the polyfunctional compound component need not be limited to one kind, but two or more kinds of each component may be used.

Thus, for instance, an amino group such as an aminocarboxylic acid, diamine or aminohydrazine is reacted with a carboxylic acid chloride or the like to form an amide linkage

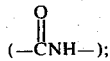

a cyclic anhydride group such as a tricarboxylic anhydride or tetracarboxylic dianhydride is reacted with an amino or isocyanate group to form an imide

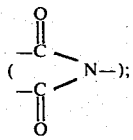

a hydrazine, dihydrazide or the like is reacted with a carboxylic acid chloride to form a diacylhydrazide linkage

the hydroxyl group of a dihydroxyl compound is reacted with a carboxylic acid chloride to form an ester linkage

an isocyanate is reacted with a carboxylic group to form an amide linkage; and an isocyanate group is reacted with an amino group to form a urea linkage

And, these linkages are introduced into the substrate polymer as the structural units B. The diacylhydrazide linkage contained in the unit B may be converted to a 1,3,4-oxadiazole linkage

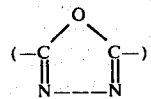

by the cyclodehydration, and it is also possible to form an o-hydroxyamide linkage by the reaction between an aminohydroxyl compound such as 2,4-diaminophenol and an acid chloride and to convert this linkage to a benzoxazole linkage

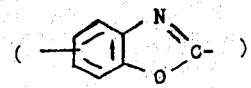

by the cyclodehydration.
The kind and amount of the components forming the main portion of the unit B of the substrate polymer should be so selected that the average number of atoms exclusive of hydrogen atoms contained in one unit B in the entire substrate polymer is not greater than 80, preferably not greater than 50, and that the value of the above-mentioned parameter Hp of hydrophilic property is at least 0.4. It is also necessary that these components are so selected that the above-mentioned requirement of solubility should be satisfied in the resulting substrate polymer.

Preferably examples of polyfunctional compounds (a) to (d) will now be illustrated.

a. Aminocarboxylic acids, tricarboxylic acids, tetracarboxylic acids and their reactive derivatives:

a-1. Aminocarboxylic acids and their reactive derivatives such as m- and p-aminobenzoic acids, 6-amino-2-naphthonic acid, 4-aminodiphenyl methane dicarboxylic acid, 3-amino-benzophenone carboxylic acid, ε-aminocaproic acid, and their amino acid chlorides hydrochloride.

a-2. Tricarboxylic anhydrides and their reactive derivatives such as trimellitic monoanhydride, naphthalene-2,3,6-tricarboxylic monoanhydride, 3,4,4'-diphenylmethane tricarboxylic monoanhydride, 1,2,5-cyclohexane tricarboxylic monoanhydride, and monochloride monoanhydrides of these acids.

a-3. Tetracarboxylic dianhydrides and their reactive derivatives such as pyromellitic dianhydride, 2,3,6,7-naphthalene tetracarboxylic dianhydride, 3,3',4,4'-diphenylmethane tetracarboxylic dianhydride, cyclobutane tetracarboxylic anhydride, 1,4,5,8-naphthalene tetracarboxylic anhydride, and their reactive derivatives.

b. Diamines, hydrazine, aminohydrazides and dihydrazides such as aliphatic diamines, e.g., ethylenediamine, tetramethylenediamine, hexamethylenediamine and octamethylenediamine; alicyclic diamines, e.g., 1,3-diaminomethylcyclohexane, 1,4-diaminomethylcyclohexane and 4,4'-diaminodicyclohexylmethane; aromatic diamines, e.g., m-phenylenediamine, p-phenylenediamine, 1,5-naphthalenediamine, 2,6-naphthalene diamine and diamines of the formula

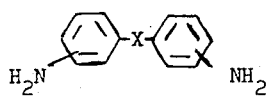

(in which X is a single bond, an alkylene group of 1 to 4 carbon atoms, —O— or —SO$_2$—); piperazine; 2,4-diaminopyridine and 2,5-diaminopyridine; 2,5-diaminofuran; 2,5-diaminothiophene; m-aminobenzoic hydrazide and p-aminobenzoic hydrazide; and isophthalic dihydrazide and terephthalic dihydrazide.

c. Dihydroxyl compounds such as ethylene glycol, tetramethyleneglycol, hexamethyleneglycol, cyclobutanol, 1,4-cyclohexane-dimethanol and p-xylyleneglycol; and aminodihydroxyl compounds such as ethanolamine, p-hydroxymethylaniline, 3,3'-dihydroxybenzidine, 2,4-diaminophenol and 1,4-diamino-2,6-dihydroxybenzene.

d. Diisocyanates such as m-phenylenediisocyanate, p-phenylenediisocyanate, 4,4'-diphenylmethane diisocyanate, 4,4'-diphenylether diisocyanate and 2,6-naphthalene diisocyanate, and masked products of these diisocyanates.

N-aryl-substituted polyamidebenzimidazoles expressed by the above formula (14-1), N-aryl-substituted polybenzimidazoles expressed by the above formula (14-2) and copolymers composed mainly of these polymers may be prepared according to the method disclosed in the above-quoted specification of U.S. Pat. No. 3,518,234 (British Pat. No. 1,236,211) or a modified method thereof. In this invention, substrate polymers prepared by other methods may be used as far as they meet the above-mentioned requirements [1] to [4]. The above method disclosed in the specification of U.S. Pat. No. 3,518,234 is characterized in that the intended polymer is obtained through a polyamideimine. In other words, in this method the reaction of forming an N-aryl-substituted-benzimidazole linkage is conducted separately from the polymer-forming reaction. In this invention, other methods may be adopted for formation of substrate polymers. For instance, polymers expressed by the above formula (14-2) and (14-1) may be prepared by polycondensing a tetramine or triamine such as expressed by the above formula (12-2) or (12-1) with a dicarboxylic acid diaryl ester under heating conditions according to the teachings of Journal of Polymers Science, A1, 1531 (1963). Further, according to the teachings given in Makromolekulare Chemie, 77, 41 (1964), polymers expressed by the above formula (14-2) may be prepared by reacting a diamine containing an N-aryl-substituted benzimidazole group, which is expressed by the following formula

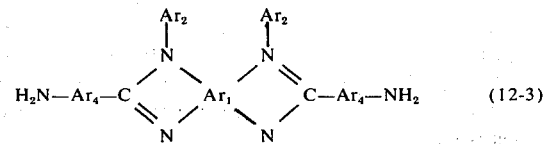

wherein Ar$_1$ and Ar$_2$ are as defined above with respect to the formula (2), and Ar$_4$ is a residue derived fromm an aminocarboxylic acid such as exemplified in (a-1) above, with a dicarboxylic acid chloride or the like.

Still further, substrate polymers other than those expressed by the above formulas (14-1) and (14-2) may be prepared, for instance, by the following methods.

For instance, N-aryl-substituted polybenzimidazoles consisting of the following recurring units

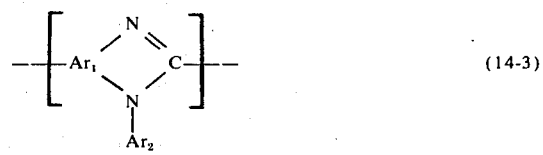

wherein Ar$_1$ and Ar$_2$ are as defined above with respect to the formula (2), may be prepared by applying the method disclosed in Journal of Polymer Science, 50, 511 (1961) to an N-aryl-substituted aromatic diaminomonocarboxylic acid expressed by the following formula

wherein $Ar_1$, $Ar_2$ are as defined above with respect to the above formula (2), and Q designates —OH, —OR (in which R is a lower alkyl group, a phenyl group or other hydrocarbon residue) or —$NH_2$, or its reactive derivative, thereby to effect the self-condensation under heating conditions.

In some cases, polybenzimidazoles consisting of the recurring units of the formula (14-3) alone fail to meet the solubility requirement [3]. In such case the solubility and hydrophilic property may be suitably adjusted by copolymerizing such polybenzimidazoles with triamines or tetramines expressed by the formula (12-1) or (12-2) and/or polyfunctional compounds such as exemplified in (a) to (d) above, whereby substrate polymers which can be used in this invention are obtained. In case a diamine and a dicarboxylic or aminocarboxylic acid or a reactive derivative thereof are used as comonomers, there is obtained a polymer, a part of the recurring units of which are expressed by the following formula

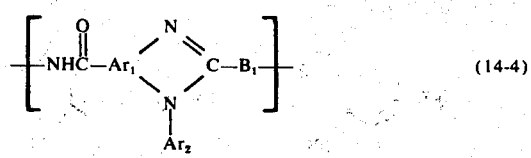

wherein $Ar_1$ and $Ar_2$ are as defined above, and $B_1$ is a residue derived from the polyfunctional compound added as the comonomer component.

When a compound of the above formula (12-4) is reacted with a dicarboxylic dichloride at a molar ratio of 2:1, there is obtained an amideimine dicarboxylic acid expressed by the following formula

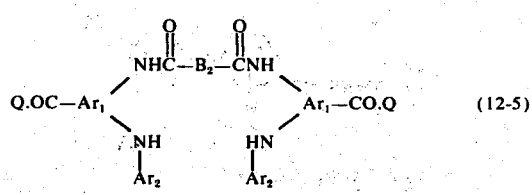

wherein $Ar_1$, $Ar_2$ and Q are as defined above, and $B_2$ designates a dicarboxylic acid residue, or a derivative thereof, and when this amideimine dicarboxylic acid or its derivative is subjected to the cyclodehydration, an N-aryl-substituted benzimidazole dicarboxylic acid of the following formula

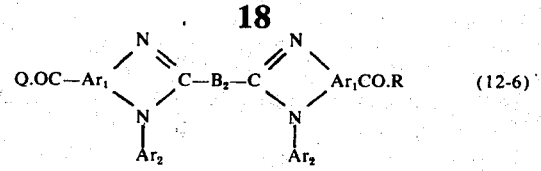

wherein $Ar_1$, $Ar_2$, $B_2$ and Q are as defined above, or its derivative is obtained. When such compound as expressed by the formula (12-5) or (12-6) or its reactive derivative is reacted with a diamine such as exemplified as in (b) above and, in the case of the compound of the formula (12-5), the cyclodehydration is subsequently effected, there is obtained a polybenzimidazole having the recurring units, each of which is composed of two recurring units of the above formula (14-4) that are alternating in the form reverse to each other, namely the recurring units expressed by the following formula

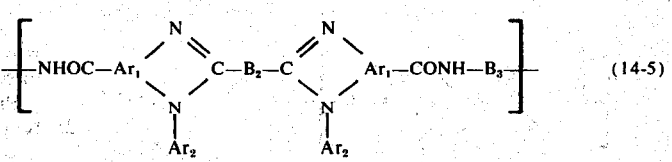

wherein $Ar_1$, $Ar_2$ and $B_2$ are as defined above, and $B_3$ is a diamine residue. In this method, preferably examples of the group Q are aryloxy and —$NH_2$ groups. In case Q is —OH, it is also possible to convert it to the corresponding diacid chloride and then react it with a diamine. Further, in case Q is —OH, it is possible to obtain a polyamide-benzimidazole having the recurring units of the formula (14-5) by employing a diisocyanate such as exemplified in (d) above instead of the diamine.

An aminohydrazide expressed by the following formula

wherein $Ar_1$ and $Ar_2$ are as defined above, may be obtained by reacting a compound of the above formula (12-4) with hydrazine according to the customary method. Similarly, a benzimidazole hydrazide expressed by the following formula

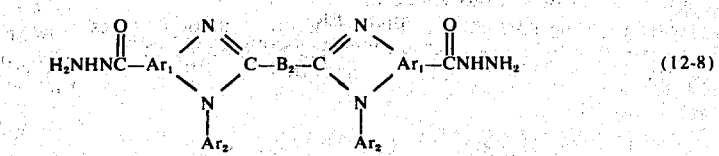

wherein $Ar_1$, $Ar_2$ and $B_2$ are as defined above, may be formed by reacting a compound of the above formual (12-6) with hydrazine.

A compound of the above formula (12-7) may be converted to a polyamideimine hydrazide expressed by the following formula

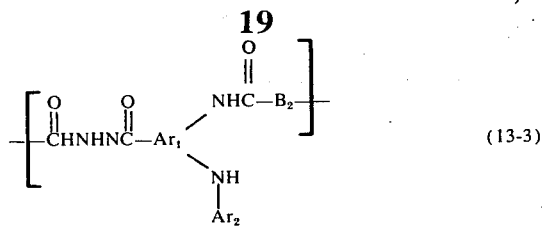

(13-3)

wherein $Ar_1$, $Ar_2$ and $B_2$ are as defined above, by reacting it with a diacid chloride at low temperatures according to the teachings given in the specification of U.S. Pat. No. 3,389,122, and when the so formed polyamideimine hydrazide is subjected to the cyclodehydration, there may be formed a polybenzimidazole-oxadiazole having the recurring units expressed by the following formula

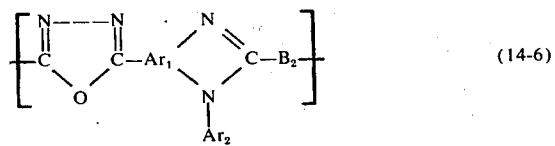

(14-6)

wherein $Ar_1$, $Ar_2$ and $B_2$ are as defined above. However, some of polymers composed solely of the recurring units expressed by the above formula (14-6) fail to meet the above solubility requirement [3]. In such case, polybenzimidazoles composed mainly of the recurring units expressed by the following formula

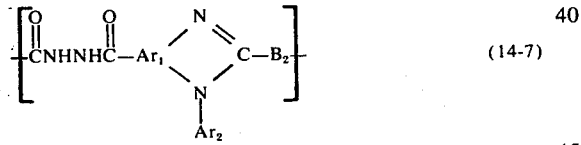

(14-7)

wherein $Ar_1$, $Ar_2$ and $B_2$ are as defined above, are formed by utilizing the phenomenon that when cyclization of an amideimine linkage to a benzimidazole ring and cyclization of a diacylhydrazide linkage to a 1,3,4-oxadiazole linkage are simultaneously conducted in the presence of an acid catalyst, the former cyclization is generally allowed to advance preferentially.

Still further, a polybenzimidazole-semicarbazide having the recurring units expressed by the following formula

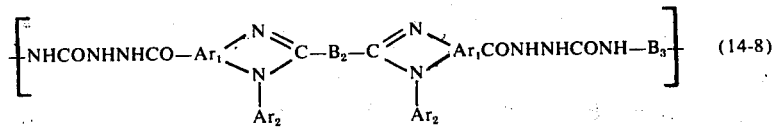

(14-8)

wherein $Ar_1$, $Ar_2$ and $B_2$ are as defined above, and $B_3$ designates a diisocyanate residue, may be formed by reacting a compound of the above formula (12-8) with a diisocyanate.

Still in addition, there may be prepared a polybenzimidazoleurea having the recurring units expressed by the following formua

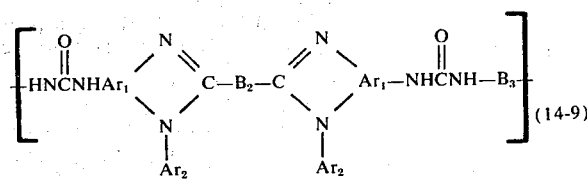

(14-9)

wherein $Ar_1$, $Ar_2$, $B_2$ and $B_3$ are as defined above, by reacting, for instance, a benzimidazole diamine expressed by the following formula

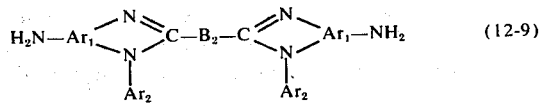

(12-9)

wherein $Ar_1$, $Ar_2$ and $B_2$ are as defined above, with a diisocyanate.

Preferable compounds to be used for introducing an N-aryl-substituted aromatic monocarboxylic monoamine group which is represented by $Ar_1$ into compounds expressed by above formulae (12-4) to (12-8) are compounds expressed by the following formulae

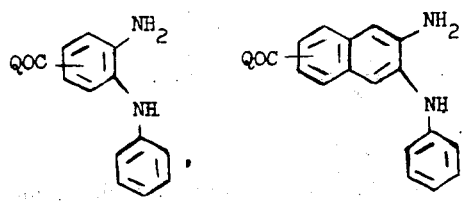

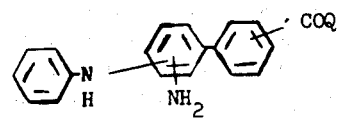

and

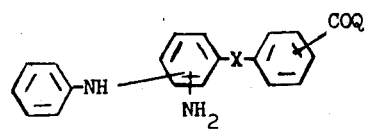

in which Q is as defined above, and X is selected from —O—, —CH$_2$—, —SO$_2$—, —S— and —CO—.

In the cyclodehydration of polymers having the N-aryl-substituted aromatic triamine or tetramine structural units of the foregoing formula (13-1), (13-2) or (13-3), all of the amideimine portions need not be converted to N-aryl-substituted benzimidazole units, but it is sufficient that at least about 50%, preferably at least about 70%, of the amideimine portions are cyclodehydrated to N-aryl-substituted benzimidazole units.

Preferable conditions to be adopted for preparing substrate polymers to be used in this invention by employing N-aryl-substituted triamines or tetramines expressed by the above formula (12–1) or (12–2) according to our previously proposed process disclosed in the specification of U.S. Pat. No. 3,518,234 or British Pat. No. 1,236,211, will now be illustrated in more details.

When aromatic triamines and/or tetramines such as mentioned above are reacted with dicarboxylic halides in an interfacial solvent system comprising an inert organic solvent such as methylethylketone, cyclohexanone, tetrahydrofuran or tetramethylenesulfone and an aqueous alkali solution, or in low temperature solution polymerization system comprising a weakly basic solvent such as N-methylpyrrolidone, hexamethylphosphoramide or N,N-dimethylacetamide, corresponding polyamideimines ae formed. When these polyamideimines are heated at a temperature exceeding 200°C., preferably 250° to 300°C., for several hours in the solid state, or when they are heated in the solution state at 60° – 200°C. in the presence of an acidic substance such as cresol, acetic acid, formic acid, phosphoric acid, sulfonic acid, sulfuric acid, boric acid and hydrogen chloride, the cyclodehydration is caused to occur and there are obtained N-aryl-substituted benzimidazole polymers. As the advantageous method for accomplishing the above reaction, there may be mentioned a method in which a polyamideimine if formed in a weakly basic aprotic polar solvent such as exemplified above and the as-obtained polyamideimine in the solution state is heated and cyclized by employing as a catalyst the hydrogen halide formed as a by-product in the above polyamideimine-forming reaction, thereby to convert the polyamideimine to the intended N-aryl-substituted benzimidazole polymer. In this advantageous method, the hydrogen halide remaining in the system may be converted to a lithium halide or calcium halide by addition of an oxide or hydroxide of lithium or calcium, and such metal halide may be used as a swelling agent in preparing a membrane from the N-aryl-substituted benzimidazole polymer, which feature will be detailed hereinbelow. Further, at the cyclization step, in order to adjust the catalytic activity of the hydrogen halide, a lower alkylene oxide may be added to convert a part of the hydrogen halide to a halohydrin.

In the above reaction, when polyfunctional comonomer components such as illustrated hereinabove are made to pertain to the reaction, substrate polymers of the copolymer type having the N-aryl-substituted benzmidazole units can be formed. These comonomer components are suitable chosen depending on specific uses of the resulting permselective membrane.

In addition to such copolymers, blends of polymers composed of components such as illustrated hereinabove may also be used in this invention.

Needless to say, any of N-aryl-substituted benzimidazole homopolymers and copolymers meeting the above requirements [1] to [4] may be used, regardless of the preparation method, for formation of the permselective membrane of this invention.

In this invention, according to any of the foregoing various methods, there may be provided N-aryl-substituted benzimidazole polymers meeting the following four requirements:

1. they have N-aryl-substituted benzimidazole units expressed by the formula (2), namely the formula (2–a) or (2–b);
2. the above-defined parameter (Hp) of hydrophilic property is at least 0.4, preferably at least 0.5, in those polymers;
3. their solubility at 25°C. in a solvent composed of at least one member selected from the group consisting of N,N-dimethylacetamide, N-methylpyrrolidone, dimethylsulfoxide and hexamethylphosphoramide (which solvent may comprise lithium chloride in an amount not exceeding 5% by weight) is at least 7% by weight; and
4. they have a molecular weight sufficient to form a film.

The above substrate polymer of this invention has the N-aryl-substituted benzimidazole units expressed by the above formula (2–a) or (2–b), and since these units comprise polar groups illustrated in Table 1, such as imidazole, amide and substituted amino groups, the substrate polymer is essentially hyrophilic. This hydrophilic property may be suitably adjusted by selecting appropriate groups as $Ar_1$, $Ar_2$ and/or $Ar_3$ on the formula (2–a) or 2–b), adjusting the kinds or ratios of comonomer components forming the units B of the substrate polymer, or controlling appropriately the degree of the cyclodehydration of the intermediate polyamideimine or its copolymer. Thus, suitable amounts of polar groups illustrated in Table 1, such as hydroxyl, amino, sulfone and oxadiazole groups, may be introduced into the substrate polymer.

Further, when amounts and kinds of $Ar_1$, $Ar_2$ and $Ar_3$ groups and/or comonomer components are appropriately adjusted and chosen, the amounts and kinds of pendant ionic groups to be contained in the substrate polymer, such as $-SO_3H$, $-SO_3Me$, $-COOH$, $-COOMe$, ammonium salt and/or quaternary ammonium salt (in which Me stands for an alkali metal or alkaline earth metal), can also be adjusted and controlled very easily.

Accordingly, in this invention it is possible to obtain easily a substrate polymer having appropriate hydrophilic property, namely a substrate polymer having a parameter (Hp) of hydrophilic property of at least 0.4, preferably at least 0.5.

Furthermore, since the substrate polymer of this invention contains N-substituted aryl groups, the molecular space is great within an appropriate range, and hence, it has an increased solubility and a suitable permselectivity. The solubility of the substrate polymer in such a solvent as mentioned in connection with the requirement [3] may be adjusted or controlled by adjusting the degree of the cyclodehydration of the intermediate polyamideimine or its copolymer or by adjusting and selecting appropriately the kinds and amounts of comonomer components. Thus, a substrate polymer having a solubility in such a solvent as specified above which is at least 7% by weight, preferably at least 10% by weight can be formed easily in this invention. The The fact that the substrate polymer of this invention has such solubility not only indicates that its processability at the step of forming a membrane is good, but also means that when the substrate polymer having an appropriate solubility (affinity) in such a polar solvent as N,N-dimethylacetamide, N-methylpyrrolidone, dimethylsulfoxide and hexamethylphosphoramide is formed into a membrane, it exhibits an appropriate permselectivity.

Methods of forming membranes from the foregoing substrate polymers will now be detailed.

6. Formation of Membranes

The permselective membrane of this invention may be obtained by forming a film from a solution composed mainly of an N-aryl-substituted benzimidazole homopolymer or copolymer such as illustrated detailedly hereinabove, in an organic polar solvent.

As preferable solvents to be used for membrane formation, there may be mentioned aprotic polar organic solvents, especially, so-called amide-type solvents such as N-methylpyrrolidone, N-methylcaprolactam, N,N-dimethylformamide, N,N-dimethylacetamide, hexamethylphosphoramide and tetramethylurea; and sulfone- and sulfoxide-type solvents such as dimethylsulfoxide and tetramethylenesulfone It is particularly preferred that such aprotic polar organic solvents have a dielectric constant ($\epsilon$) of a least 15.

When a polymer solution is prepared by employing such a solvent as mentioned above, solubility, drying property, solidifying property and other properties may be adjusted by addition of a suitable diluent. As such diluent there may be preferably used, for instance, water, methanol, ethanol, chloroethanol, ethyleneglycol, chloropropanol, ethyl acetate and chloroform. It is desired that such diluent is used in such an amount that the substrate polymer dissolved in the aprotic polar organic solvent is not caused to precipitate and the film does not lose transparency during the membrane-molding step.

In this invention, for formation of permselective membranes there is preferably employed a process comprising partially solidifying a solution comprising (a) a linear substrate polymer having the above-mentioned N-aryl-substituted benzimidazole structural units and (b) an aprotic polar organic solvent capable of dissolving said substrate polymer therein, such as exemplified above, or a mixture of said solvent with a diluent such as mentioned above (such solvent and its mixture will be inclusively referred to as "aprotic organic solvent" hereinbelow), if desired, together with (c) a low molecule compound which is soluble in both the organic solvent (b) and a non-solvent (d) mentioned below and has a molecular weight not exceeding 500, to such an extent that the resulting partially solidified product has a self-sustaining property, dipping the partially solidified product into (d) a non-solvent for said linear substrate polymer, which has a compatibility with said polar organic solvent, and thereby extracting at least 75% by weight of said polar organic solvent (b) or of said polar organic solvent (b) and low molecule compound (c) left in said partially solidified product. In accordance with this preferable process, there may be found permselective membranes having excellent permselective characteristics.

This preferable proces of this invention for the preparation of permselective membranes will now be illustrated.

In this invention, the substrate polymer (a) having the above-mentioned N-aryl-substituted benzimidazole recurring units is dissolved in the aprotic polar organic solvent (b) in such an amount that the polymer concentration is about 7 to about 50% by weight, preferably about 10 to about 35% by weight. In this case, a suitable amount of a diluent such as mentioned above may be added before or after dissolution of the substrate polymer. The dissolution of the substrate polymer into the polar organic solvent is conducted at an appropriate temperature within a range of from room temperature to 100°C.

In the dissolution of the substrate polymer, it is preferred that inorganic salts such as lithium chloride, lithium bromide, lithium nitrate, calcium chloride, calcium bromide, calcium nitrate and magnesium perchlorate, and organic compounds such as urea, ethyleneglycol, glycerine and formamide are added as low molecule compounds (c) being soluble in both the aprotic polar solvent (b) and a non-solvent (d) for the substrate polymer (a), which will be detailed hereinbelow, and having a molecular weight not exceeding 500. Inorganic salts such as exemplified above are especially preferably used as low molecule compounds (c). The dissolution of the low molecule compound (c) into the aprotic polar organic solvent (b) may be effected at any time. Namely, such low molecule compound (c) may be dissolved in the organic solvent (b) before, during or after the dissolution of the substrate polymer (a) into the solvent (b).

The so formed solution comprising the substrate polymer (a) and the aprotic polar organic solvent (b) optionally together with the low molecule compound (c) is partially solidified by separating and removing a part of the solvent therefrom to such an extent that the substrate polymer in the solution comes to have a self-sustaining property, whereby a partially solidified membrane of the substrate polymer (a) is obtained.

It is preferred that such partially solidified membrane contains 200 to 25% by weight, especially 150 to 50% by weight, of the aprotic polar organic solvent (b) or said solvent (b) and the low molecule compound (c) based on the substrate polymer (a) in the partially solidified membrane. It is also preferred that the amount of the low molecule compound 50in the starting solution is less than 0% by weight, especially 5 to 30% by weight, based on the substrate polymer.

Preferable temperatures for partial drying to obtain such partially solidified membrane vary depending on the kind of the solvent, the casting thickness, the drying time, the feed rate of the drying hot air and other factors, but in case the solidification is effected according to the drying method, preferable temperatures range from 30° to 200°C., especially from 80° to 150°C.

In preparing the above-mentioned partially solidified membrane, it is possible to mold it into a suitable form. For instance, the substrate polymer may be molded into not only a film form but also a thin coating formed on a porous plate or substrate material or a hollow fiber, etc. In case formation of a permselective membrane of the film form is intended, the above-mentioned solution is cast on a belt or plate. In case a porous substrate material is employed, the solution is coated on the substrate material by means of, for instance, roll coating, spray coating and dipping. In case a membrane of the hollow fiber form is prepared, the solution is extruded from spinnerets for hollow fibers. Thus, the above solution is formed into a partially solidified film or membrane by a dry or wet method or a combination of dry and wet methods.

In this invention, the so formed partially solidified product of the substrate polymer having a self-sustaining property is dipped in a non-solvent (d) which has a compatibility with the aprotic polar organic solvent (b) but cannot dissolve the substrate polymer (a) therein, and at least 75% by weight of the remaining solvent (b) or at least 75% by weight of each of the solvent (h) and the low molecule compound (c), when it is dissolved in the solent (a), is extracted and separated from the partially solidified membrane. It is desired that this extraction is effected to such an extent that 80 to 100% by weight of the remaining solvent or 80 to 100% by weight each of the remaining solvent and low molecule compound may be separated. Thus, a permselective membrane of this invention is prepared.

Preferable examples of the non-solvent (d) to be used for dipping of the partially solidified film or membrane include, for instance, water, alcohols such as methanol, ethanol, propanol, butanol, ethyleneglycol and glycerine, and aqueous solutions of such alcohols. Use of water, methanol, ethanol or an aqueous solution of methanol or ethanol is especially advantageous. In general, extraction is preferably carried out at a temperature ranging from −20° to 50°C. When dipping extraction is effected at too high a temperature, although the extraction rate may be accelerated, care must be taken because properties of the membrane are extremely damaged by loss of transparency and formation of heterogeneous portions in the membrane. In general, the dipping extraction is conducted for a time sufficient to extract at least 75% by weight each of the remaining solvent and low molecule compound from the partially solidified film or membrane. It is desired that after the extraction step, the resulting membrane is stored in water and the water-containing state is kept in the membrane. In general, the water content of the membrane is about 25 to 75% by weight. "The water content of the membrane" is calculated by the following formula advance and on this side the degree of solidification is accelerated. In the case of the dry method, the solvent is evaporated preferentially from one membrane surface and while a part of the solvent still remains, the membrane is dipped into the non-solvent (d) to extract and remove the remaining solvent and the like. In this case, it is nnecessary to add as the low molecule compound (c) an inorganic or organic salt or an organic compound which is different from the organic solvent with respect to the average size and volatilizing rate, and the permselectivity of the resulting membrane can be greatly improved by removing such low molecule compound (c) at the extraction step.

The permselective membrane of this invention has generally a thickness of 2 to 400 $\mu$. In case the membrane is of the film form, the thickness of the membrane is 10 to 400 $\mu$, preferably 40 to 200 $\mu$. In the case of a hollow fiber, it has generally an outer diameter of 20 to 150 $\mu$, a thickness of 5 to 40 $\mu$ and a void ratio of 0.1 to 0.6.

The permselective membrane of this invention can be prepared easily and it exhibits good water permeability and desalinizing property when it is used for desalination or demineralization of sea water and brackish water by the reverse osmosis method. Further, since the substrate polymer of the membrane is chemically very stable and has excellent mechanical properties, it can endure a long-time use and even under high pressure it exhibits a good form-stability and a very low reduction of water permeability. Therefore, the permselective membrane of this invention has a very $$\text{water content (\%)} = \frac{\text{weight of water contained in membrane}}{\text{weight of set membrane}} \times 100$$

In some cases, when the membrane is treated with hot water maintained at 70° − 95°C. after the dipping extraction step, properties such as desalinizing ability can be further improved.

In this invention, when the low molecule compound (c) is made present in a solution of the substrate polymer (a) in the aprotic polar organic solvent, on dipping of the partially solidified membrane into the non-solvent (d); not only the organic solvent (b) but also the excellent practical value.

In general, when the permselective membrane of this invention is used for desalination or demineralization of sea water or brackish water by the reverse osmosis method, it exhibits such excellent permselective characteristics that the water permeability Wp is 5 to 1300 l/m²/hour atm and the salt rejection is 40 to 99.8%, the water permeability and salt rejection being calculated by the following formulae:

$$\text{water permeability Wp} = \frac{\text{amount of permeated water (liters)}}{\text{membrane area (m}^2\text{)} \times \text{time (hr)} \times \text{pressure (atm)}} \times 10^3$$

$$\text{salt rejection (\%)} = \left(1 - \frac{\text{salt concentration in permeated water}}{\text{salt concentration in feed water}}\right) \times 100$$

low molecule compound (c) is extracted and separated from the partially solidified membrane. As a result, the obtained permselective membrane has a very minute porous structure, by dint of which the permselectivity of the membrane can be further enhanced.

As in the case of cellulose acetate membrane proposed by Loeb et al. (U.S. Pat. No. 3,133,132), the substrate polymer to be used in this invention may be formed into a permselective membrane having an asymmetric structure, namely a double-layer structure composed of a thin dense upper layer and a thick, relatively porous layer. For instance, in the case of the wet film-forming method, only one film surface is allowed to have a contact with the non-solvent (d) in In determination of the water permeability Wp according to the above formula, the pressure (atm) means the effective reverse osmosis pressure, that is ($\Delta p - \Delta \pi$) where $\Delta p$ is the difference in hydraulic pressures across membrane, and $\Delta \pi$ is the difference in osmotic pressures across the membrane.

The permselective polymeric membrane of this invention can be clearly distinguished from the membrane of the above-mentioned U.S. Pat. No. 3,567,632 in that the substrate polymer of the permselective membrane of this invention contains N-aryl-substituted groups in its main chain, and by dint of the presence of said N-aryl-substituted groups, the permselective membrane of this invention has a permselectivity highly improved over the permselective membrane of said U.S. Pat. No. 3,567,632. As is seen from Examples given hereinbelow, when poly(metaphenylene isophthalamide/terephthalamide) copolymer which is a typical instance of the substrate polymer of said U.S. Patent is compared with the polyamide-benzimidazole of this invention, the polymer of this invention can be formed into a membrane more easily and the permeation characteristics, especially permselective permeability, of the membrane formed from the polymer of this invention are highly improved over those of the membrane formed from the polymer of said U.S. Patent.

The permselective membrane of this invention is effectively employed for not only desalination or dimineralization of sea water or brackish water but also treatment of poisonous waste waters discharged from pulp fucteries, plating works and similar plants, separation treatment of radioactive waste waters discharged from atomic piles or the like, or separation or concentration of various components in pharmaceutical, biochemical and dietary industries. In addition, the permselective membrane of this invention may be used for dialysis and electrolytic dialysis and be utilized in other fields broadly.

This invention will now be illustrated more detailedly by reference to Examples. These Examples are given for better illustration of this invention and the scope of this invention is not limited by these Examples.

EXAMPLE 1

In accordance with the method disclosed in the specification of U.S. Pat. No. 3,518,234, a polyamideimine having an inherent viscosity of 0.85 (measured at 30°C. as a solution of 0.5 g polymer in 100 ml of N-methylpyrrolidone; values of the inherent viscosity given hereinbelow are those determined in this way unless otherwise indicated) was prepared from terephthaloyl chloride and 2,4-diaminodiphenylamine by the interfacial polycondensation employing the methylethylketone-water system. This polyamideimine was treated at 280° – 300°C. for 3 hours in a nitrogen atmosphere to obtain a polyamidebenzimidazole having an inherent viscosity of 1.93. As a result of the infrared absorption spectrum analysis, it was found that the conversion to the polyamide-benzimidazole was more than 95%, and this polymer had the recurring units expressed by the following formula

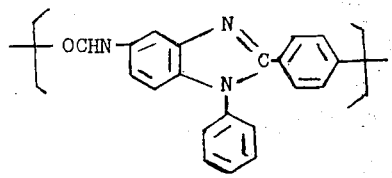

By the calculation, the hydrophilic parameter (Hp) of the polymer was found to be 0.65. When the $\bar{N}r/\bar{s}$ value of this polymer was calculated according to the method described in U.S. Pat. No. 3,567,632, it was found that the above value was 12 and hence, the polymer obtained in this Example was apparently outside the scope of said U.S. Patent.

This polyamide-benzimidazole was dissolved in N-methylpyrrolidone so that the polymer concentration was 15% by weight, and lithium chloride was further dissolved therein in an amount of 20% by weight based on the polymer weight. The resulting solution was filtered with a microfilter and cast in a thickness of 60 $\mu$ on a smooth glass plate at room temperature by means of a doctor knife. The casting was dried at 130°C. for 15 minutes, and it was then dipped into methanol maintained at 30°C. for about 30 minutes together with the glass plate. The film was peeled off from the glass plate and dipped in a great quantity of water at room temperature all night long.

The so formed membrane was transparent and had a dark brown appearance. The thickness of the membrane was 33 – 36 $\mu$ and the water content was 56%. A part of the resulting membrane was cut, dried and subjected to the atomic absorption analysis, and as a result it was found that the amount of remaining lithium chloride was less than 0.003%.

The wet membrane was set to reverse osmosis apparatus especially designed to enable pressurization of up to 150 Kg/cm$^2$. The membrane area was 11.3 cm$^2$, and a support of a pore size of 5 $\mu$ composed of sintered stainless steel disc and filter paper was employed. The membrane was disposed so that the surface which had been allowed to contact with air at the time of drying during the initial stage of the membrane formation was to face the high pressure solution side. A saline solution of a concentration of 0.105% (having an osmotic pressure of 0.75 atm as measured at 25°C.) was used and the permeation test was conducted at 25°C. under a pressure of 6.0 Kg/cm$^2$.

The amount of water permeated through the membrane was periodically determined, and the salt concentration of the permeated water was determined conductometrically to know the salt rejection. As a result, it was found that the water flux was 5.4 l/m$^2$/hr, the salt rejection was 95.0% and the water permeability Wp was 1030.

The above experiment was repeated in the same manner except that the air-contacted surface was disposed to face the high pressure solution side. It was found that the water flux was 6.0 l/m$^2$/hr, the salt rejection was 93.5% and the water permeability Wp was 1140. Thus, it will readily be understood that the membrane obtained in this Example exhibited good water permeability and high desalinizing activity even under such a low pressure as 6.0 Kg/cm$^2$.

A membrane prepared in the same manner as above was treated with hot water maintained at 80°C. for 5 minutes, and it was tested in the same manner as above. When the front surface (the surface which had been allowed to have a contact with air during the membrane formation by evaporation of the solvent; the back surface means the surface opposite to said front surface; same will apply hereinbelow) was disposed to face the high pressure solution side, the water flux was 3.0 l/m$^2$/hr, the salt rejection was 98% and the water permeability Wp was 570. When the back surface was disposed to face the high pressure solution side, the wate flux was 3.2 l/m$^2$/hr, the salt rejection was 94% and the water permeability Wp was 610.

For comparison, a copolyamide having an inherent viscosity of 1.60 was prepared from 100 mol % of m-phenylene diamine, 30 mole % of terephthaloyl chloride and 70 mole % of isophthaloyl chloride by the low temperature solution polycondensation employing N-methylpyrrolidone system according to the method disclosed in said U.S. Pat. No. 3,567,632, and a solution of 15% by weight of the copolymer in N-methylpyrrolidone containing lithium chloride in an amount of 20% by weight based on the polymer weight was prepared. From this solution was formed a white semi-transparent membrane of a thickness of 40 – 44 $\mu$ under the same drying and dipping conditions as described above.

The resulting membrane was subjected to the same permeation test under a pressure of 6.0 Kg/cm$^2$ with use of a 0.105% saline solution. When the front surface was disposed to face the high pressure solution side, the water flux was 2.2 l/m$^2$/hr, the salt rejection was 28% and the water permeability Wp was 420. When the back surface was disposed to face the high pressure solution side, the water flux was 2.5 l/m$^2$/hr, the desalinizing ratio was 9.4% and the water permeability Wp was 477.

Further, this membrane was treated with hot water maintained at 80°C for 5 hours, and it was tested in the same manner as above. When the front surface was disposed to face the high pressure solution side, the waer flux was 1.0 l/m$^2$/hr, the salt rejection was 50% and water permeability Wp was 190. When the back surface was disposed to face the high pressure solution, the water flux was 1.65 l/m$^2$/hr, salt rejection was 41% and the water permeability Wp was 314.

EXAMPLE 2

In accordance with the same process as employed in Example 1, a copolyamide-benzimidazole having a hydrophilic parameter Hp of 0.61 and an inherent viscosity of 1.45 was prepared from 100 mole % of terephthaloyl chloride, 80 mole % of 2,4-diaminodiphenylamine and 20 mole % of 4,4'-diaminodiphenylether, and this copolymer was dissolved into N-methylpyrrolidone so that the copolymer concentration was 15% by weight. Then, calcium chloride was added and homogeneously dissolved in the solution in an amount of 20% by weight based on the polymer weight. A membrane was prepared from this solution under the same conditions as in Example 1.

The resulting membrane had a thickness of 23 $\mu$ and a water content of 65.5%, and as a result of the atomic absorption analysis it was found that the amount of calcium chloride left in the membrane was 0.019%.

With use of the same apparatus as employed in Example 1, the membrane was subjected to the permeation test under a pressure of 6.0 Kg/cm$^2$ by employing a 0.105% saline solution. When the front surface was disposed to face the high pressure solution side, the water flux was 6.47 l/m$^2$/hr, the water permeability Wp was 1230 and the salt rejection was 93%. When the back surface was disposed to face the high pressure solution side, the water flux was 6.37 l/m$^2$/hr, the water permeability Wp was 1210 and the salt rejection was 92%.

EXAMPLE 3

A 3.5% saline solution (having an osmotic pressure of 24.5 atm as measured at 25°C.) was charged in the same reverse osomosis apparatus as used in Example 1, to which a membrane prepared in the same manner as in Example 2 was set, and the permeation test was carefully out under a pressure of 100 Kg/cm$^2$. When the front surface of the membrane was disposed to face the high pressure solution side, the water flux was 27.3 l/m$^2$/hr, the water permeability Wp was 362 and the salt rejection was 97%. When the back surface of the membrane was disposed to face the high pressure solution side, the water flux was 33.5 l/m$^2$/hr, the water permeability Wp was 445, and the desalinizing ratio was 89%.

EXAMPLE 4

A 15% by weight solution of the copolyamide-benzimidazole prepared in Example 2 in N-methylpyrrolidone was cast on a glass plate and dried at 100°C. for 3 minutes. Then, the casting was dipped in a 40% aqueous solution of calcium chloride maintained at 100°C. for 10 minutes to obtain a yellow semi-transparent membrane.

After it had been dipped in a great quantity of water for 3 days, the membrane was subjected to the reverse osmosis test under a pressure of 80 Kg/cm$^2$ at 25°C. with use of a 3.5% saline solution. When the front surface of the membrane was disposed to face the high pressure solution side, the water flux was 2.34 l/m$^2$/hr, the water permeability Wp was 42 and the salt rejection was 95%. The tested membrane had a thickness of 10 $\mu$ and a water content of 28%.

EXAMPLE 5

A solution comprising 15 parts by weight of the copolyamidebenzimidazole prepared in Example 2, 4.5 parts by weight of lithium chloride and 80.5 parts by wight of N-methylpyrrolidone was prepared, and it was filtered with a microfilter, following which the solution was cast on a glass plate in a thickness of 350 $\mu$. The drying was effected at 130°C. for 15 minutes, and the casting was dipped in water maintained at room temperature for one day. The resulting membrane had a thickness of 75 $\mu$ and a water content of 67%.

The so formed membrane was set to the same reverse osmosis apparatus as used in Example 1, and the permeation test was carried out at 25°C. under 80 Kg/cm$^2$ by employing an aqueous solution containing 1.0% by weight of an inorganic salt indicated in Table 2 below. Results are shown in Table 2.

Table 2

| Kind of inorganic salt | Water flux (l/m$^2$/hr) | Water permeability (Wp) | Salt rejection (%) |
|---|---|---|---|
| LiCl | 14.0 | 195 | 99.1 |
| NaCl | 17.5 | 244 | 99.5 |
| CaCl$_2$ | 16.0 | 222 | 99.8 |
| LiNO$_3$ | 15.8 | 220 | 98.2 |
| NaNO$_3$ | 14.3 | 185 | 98.5 |
| Ca(NO$_3$)$_2$ | 16.5 | 230 | 99.8 |

EXAMPLE 6

A solution comprising 6 g of the copolyamide-benzimidazole of an inherent viscosity of 1.45 employed in Example 2, 1.8 g of calcium chloride and 30 g of N-methylpyrrolidone was cast on a glass plate and dried at 130°C. for 15 minutes in the air. The casting was dipped in a great quantity of water maintained at room temperature together with the glass plate, to remove the remaining solvent and calcium chloride therefrom. Thus, a membrane having a thickness of 28 $\mu$ was obtained.

The so formed membrane was set to the same apparatus as used in Example 1, and the permeation test was carried out under a pressure of 80.0 Kg/cm$^2$ with the use of a 1.05% saline solution while varying the temperature of the feed solution as indicated in Table 3. Results are shown in Table 3.

Table 3

| Substrate polymer | Membrane thickness ($\mu$) Before pressurization | Membrane thickness ($\mu$) After pressurization | Temperature of feed solution 25°C Water flux (l/m²/hr) | 25°C Salt rejection (%) | 50°C Water flux (l/m²/hr) | 50°C Salt rejection (%) | 80°C Water flux (l/m²/hr) | 80°C Salt rejection (%) |
|---|---|---|---|---|---|---|---|---|
| copolyamide-benzimidazole | 28 | 26 | 15.5 | 96.6 | 33.8 | 92.0 | 45.5 | 88.5 |

EXAMPLES 7 to 20

The permeability of a permselective membrane may also be evaluated based on the direct osmosis to a solution having an osmotic pressure. In view of this fact, these experiments were carried out.

A solution of N-methylpyrrolidone containing 15% by weight of the copolyamide-benzimidazole obtained in Example 2 was incorporated with an inorganic salt or low molecule compound indicated in Table 4 in the amount also indicated in Table 4, and the resulting solution was formed into a membrane by the membrane-forming method described in Example 1. The membrane so formed was used as a diaphragm positioned between a saline water having a concentration of 4.0% by weight (the osmotic pressure being 32.5 atm as measured at 25°C.) and pure water, and the water permeation rate and salt permeation rate were determined at 25.0°C. Results are shown in Table 4.

herent viscosity of 0.71 and a hydrophilic parameter of 0.61.

The resulting polymer solution was divided into two portions. Lithium chloride was added to one portion in an amount of 20% by weight based on the polymer weight. Then, the two portions of the solution were separately cast on a glass plate, dried at 115°C. for 15 minutes and dipped into methanol at room temperature together with the glass plate.

With use of the so formed membranes, the permeation test was carried out at 25°C. under a pressure of 6.0 Kg/cm² by employing a 0.105% saline solution. Each membrane was disposed so that the front surface was to face the high pressure solution side.

The membrane prepared from the lithium chloride-free solution (containing small amount of hydrochloric acid, propylene oxide and propylene chlorohydrin) had Table 4

| Example No. | Additive Kind | Additive Amount** | Water content of membrane (%) | Membrane thickness ($\mu$) | Water flux ($\mu$g/cm²/sec) | Salt flux ($\mu$g/cm²/sec) |
|---|---|---|---|---|---|---|
| 7 | — | 0 | 18.4 | 13 | 5.8 | 0.005 |
| 8 | LiCl | 1 | 21.8 | 5 | 10.0 | 0.010 |
| 9 | LiCl | 2 | 24.3 | 5 | 16.0 | 0.013 |
| 10 | LiCl | 5 | 50.6 | 17 | 57.0 | 0.015 |
| 11 | LiCl | 10 | 54.5 | 13 | 150.0 | 0.100 |
| 12 | LiCl | 20 | 56.0 | 30 | 295.0 | 0.125 |
| 13 | CaCl₂ | 1 | 22.0 | 4 | 7.4 | 0.085 |
| 14 | CaCl₂ | 3 | 31.0 | 14 | 12.4 | 0.053 |
| 15 | CaCl₂ | 5 | 37.0 | 5 | 44.3 | 0.094 |
| 16 | CaCl₂ | 10 | 46.0 | 18 | 131.0 | 0.234 |
| 17 | CaCl₂ | 20 | 65.5 | 23 | 360.0 | 0.263 |
| 18 | Mg(ClO₄)₂ | 20 | 21.2 | 21 | 8.3 | 0.003 |
| 19 | urea | 15 | 24.3 | 18 | 11.2 | 0.051 |
| 20 | glycerine | 20 | 31.0 | 28 | 10.1 | 0.024 |
| comparison* | LiCl | 20 | 42 | | 86 | 0.93 |

*Aromatic polyamide prepared in Example 1 as a comparative polymer was used as the substrate polymer.
**The amount of the additive was expressed in terms of the percent by weight based on the polymer weight.

EXAMPLE 21

A solution of N,N-dimethylacetamide containing a copolyamideimine at a concentration of 15% by weight was prepared from 25 mole % of terephthaloyl chloride, 75 mole % of isophthaloyl chloride, 80 mole % of 2,4-diaminodiphenylamine and 20 mole % of 4,4'-diaminodiphenylether by conducting a customary low temperature solution polymerization method in the presence of N,N-dimethylacetamide. Then, propylene oxide was added to the solution in an amount equimolar to hydrochloric acid remaining in the solution, and the solution was heated at 100°C. for 1 hour to convert the copolyamide-imide to a corresponding copolyamide-benzimidazole. By the infrared absorption spectrum analysis, it was confirmed that the cyclodehydration was caused to occur in the copolyamide-imide. The resulting copolyamide-benzimidazole had an ina thickness of 15 $\mu$ and a water content of 25%. At the permeation test of this membrane, the water permeation rate was 0.50 l/m²/hr, the water permeability Wp was 95 and the desalinizing ratio was 98.5%.

The membrane prepared from the solution containing 20% by weight of lithium chloride based on the polymer weight had a thickness of 18 $\mu$ and a water content of 54%. At the permeation test of this membrane, the water flux rate was 3.8 l/m²/hr, the water permeability Wp was 720, and the salt rejection was 97.6%.

EXAMPLE 22

In accordance with the same polymerization method as described in Example 1, a polyamideimine having the following structural units

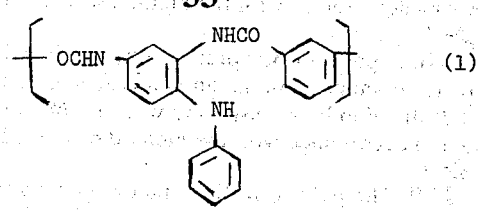

was prepared from 2,4-diaminodiphenylamine and isophthaloyl chloride.

A part of the so formed polyamideimine was subjected to the cyclodehydration in the same manner as in Example 1 to obtain a polyamide-benzimidazole having the following structural units

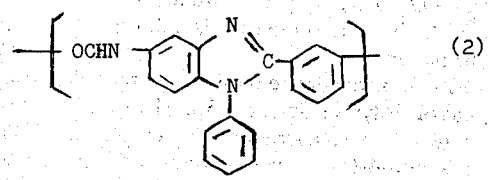

in which more than 95% of the amideimine linkages were converted to the amide-benzimidazole linkages.

The $\overline{N}r/s$ value of the polyamideimine (1) was calculated according to the disclosure of the above-quoted U.S. Pat. No. 3,567,632, and it was found that the value was 6.5 and the polyamideimine was included in the scope of said U.S. Patent. Similarly, the $\overline{N}r/s$ value of the polyamide-benzimidazole (2) was calculated, and it was found that the value was 12 and the polymer (2) was outside the scope of said U.S. Patent.

A solution comprising 10 parts by weight of the polymer (1), 3 parts by weight of lithium chloride and 87 parts by weight of N-methylpyrrolidone was prepared. Similarly, a solution comprising 10 parts by weight of the polymer (2), 3 parts by weight of lithium chloride and 87 parts by weight of N-methylpyrrolidone was prepared. Both the solutions were cast on a glass plate, dried at 130°C. for 15 minutes and dipped in water at room temperature for one day.

The so obtained membranes derived from polymers (1) and (2) were subjected to the permeation test at 25°C. under a pressure of 80 Kg/cm² with use of the same reverse osmosis apparatus as employed in Example 1 by using a 1.0% saline solution. Results are shown in Table 5.

Table 5

|  | Substrate Polymer | |
|---|---|---|
|  | Polymer of recurring units (1) (comparison) | Polymer of recurring units (2) |
| Membrane thickness ($\mu$) | 48 | 52 |
| Water content (%) | 53 | 65 |
| Water flux rate (l/m²/hr) | 4.3 | 17.8 |
| Water permeability Wp | 60 | 248 |
| Salt rejection (%) | 92.1 | 98.6 |

From the test result shown in Table 5, it will readily be understood that the N-aryl-substituted benzimidazole linkage exhibits a great contribution to improvement of permselective characteristics.

EXAMPLE 23

In accordance with the polymerization method described in Example 1, a copolyamide-benzimidazole was prepared from 80 mole % of 2,4-diaminodiphenylamine and 20 mole % of 3,3'-diaminodiphenylsulfone. This polymer had a hydrophilic parameter Hp of 0.61.

In the same manner as described in Example 1, a solution of the polymer in N-methylpyrrolidone having a polymer concentration of 15% by weight was prepared and formed into a membrane.

For comparison, a polyamide was prepared from 3,3'-diaminodiphenylsulfone and terephthaloyl chloride by the same method as adopted in Example 1 for formation of the comparative polymer. With use of the so formed polyamide, a membrane was prepared in the same manner as described above.

The so prepared two membranes were subjected to the reverse osmosis test at 25°C. under a pressure of 80 Kg/cm² by employing a 1.0% saline solution. Results are shown in Table 6.

Table 6

|  | Substrate Polymer | |
|---|---|---|
|  | Copolyamide-benzimidazole | Polyamide (comparison) |
| Water content (%) | 61 | 53 |
| Membrane thickness ($\mu$) | 53 | 50 |
| Water flux (l/m²/hr) | 32.8 | 17.6 |
| Water permeability Wp | 455 | 244 |
| Salt rejection (%) | 96.0 | 66.5 |

EXAMPLE 24

In accordance with the polymerization method and heating cyclodehydration method described in Example 1, a copolyamide-benzimidazole having an inherent viscosity of 0.65 was prepared from 2.03 g (0.007 mole) of 1,5-diamino-2,4-dianilinobenzene, 0.324 g (0.003 mole) of metaphenylenediamine and 2.03 g (0.01 mole) os isophthaloyl chloride. This polymer had a hydrophilic parameter Hp of 0.62

Then, 2.0 g of this polymer was homogeneously dissolved into a solution comprising 20 g of N-methylpyrrolidone and 0.60 g of lithium chloride, and the resulting solution was cast on a glass plate in a casting thickness of about 200 $\mu$ and was kept in a thermostat drier maintained at 110°C. until the ratio of the remaining solvent was reduced to about 60%. Then, the casting was dipped in a great quantity of ion-exchange water for one day.

The resulting membrane had a thickness of 45 $\mu$ and a water content of 56%.

With use of the same reverse osmosis apparatus as employed in Example 1, the reverse osmosis test of the so formed membrane was carried out under the same conditions as adopted in Example 21. The water flux was 20.8 l/m²/hr, the water permeability Wp was 290, and the salt rejection was 88%.

EXAMPLES 25 to 35

Polymers having the structural units shown in Table 7 were prepared according to polymerization methods described below, and membranes were prepared under conditions as shown in Table 8. Results of the permeation test of the membranes are shown in Table 9.

POLYMER-PREPARING METHODS

I. 70 mole % of 2,4-diaminodiphenylamine and 30 % of m-aminobenzoic acid hydrazide were reacted with terephthaloyl chloride in N-methylpyrrolidone. The resulting polymer was precipitated in water and maintained at 300°C. for 3 hours under reduced pressure, thereby to obtain an intended polymer. The structure of the polymer was determined basedon the infrared absorption spectrum analysis. Namely, an absorption characteristic of the oxadiazole ring was observed at 1080 cm$^{-1}$ and absorptions characteristic of the N-substituted imidazole ring were observed at 1320 cm$^{-1}$ and 1380 cm$^{-1}$.

II. A polymer was prepared by reacting 70 mole % of 2,4-diaminodiphenylamine and 30 mole % of isophthaloyl dihydrazide with terephthaloyl chloride in the same manner as in (I) above.

III. A copolyamideimine was prepared from 75 mole % of terephthaloyl chloride, 25 mole % of fumaryl chloride and 2,4-diaminodiphenylamine by the interfacial polymerization method using a methylethylketone-water system, and the resulting polyamideimine was dissolved in N-methylpyrrolidone containing a small amount of hydrochloric acid, following which the solution was stirred at 120°C. for 2 hours to obtain an intended polymer. The structure of the polymer was determined by the infrared absorption spectrum analysis.

IV. 80 mole % of 2,4-diaminodiphenylamine and 20 mole % of 2,4-diamino-4'-carboxydiphenylamine-hydrochloride were polymerized with terephthaloyl chloride in N-methylpyrrolidone. Calcium hydroxide was thrown into the resulting polymer solution in an amount sufficient to neutralize 95% of hydrochloric acid present in the solution. Then, the solution was stirred at 120°C. for 2 hours to obtain an intended polymer.

V. 20 mole % of 4-chloroformyl-N-(3-chloroformyl) phthalimide of the following formula

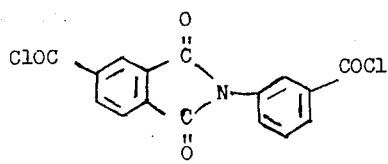

80 mol % of terephthaloyl chloride and 100 mol % of 2,4-diaminodiphenylamine were polymerized and cyclodehydrated in the same manner as set forth in Example 1 to form a polymer.

VI. A polymer was prepared from 4-(2,4-diaminoanilino)diphenyl ether and terephthaloyl chloride in accordance with the method described in Example 1.

VII. A polymer was prepared by reacting 70 mole % of 1,3-diamino-2,4-dianilinobenzene and 30 mole % of 3,3'-diaminodiphenylsulfone with terephthaloyl chloride in accordance with the method described in Example 1.

VIII. The polymerization and cyclodehydration were carried out in the same manner as described in (IV) above the employing 75 mole % of 1,3-diamino-3,4-dianilinobenzene, 25 mole % of m-aminobenzoic acid hydrazine and terephthaloyl chloride. By the infrared absorption spectrum analysis it was confirmed that under the cyclodehydration conditions adopted, the formation of the N-phenylbenzimidazole ring was caused to occur preferentially and the conversion of the hydrazide to the oxadiazole ring was hardly caused to occur.

IX. In accordance with the method disclosed in Journal of Polymer Science, 50, 511 (1961), the melt condensation was carried out by employing 70 mole % of 3-amino-4-(N-phenyl)-aminobenzoic acid phenyl ester and 30 mole % of m-amino-benzoic acid phenyl ester.

X. In accordance with the method disclosed in Examples of U.S. Pat. No. 3,389,122, polyamideimine hydrazide was prepared by reacting 3-amino-4-(N-4-biphenyl)-amino-benzoyl hydrazide with terephthaloyl chloride in N-methylpyrrolidone. Calcium hydroxide was added to the resulting polymer solution in an amount sufficient to neutralize 95% of hydrochloric acid present in the solution. Then, the solution was maintained at 120°C. for 2 hours to obtain an intended polymer.

XI. An intended polymer was prepared by polymerizing 1,3-phenylene-2,2'-bis-[5-carboxy-(N-phenyl)-benzimidazole] of the following formula

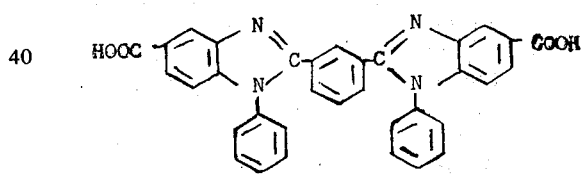

with 4,4'-diphenylmethane diisocyanate at 160° – 180°C. in N-methylpyrrolidone.

Table 7

| Structural Units and Inherent Viscosities of Polymer | |
|---|---|
| Structural Unit | $\eta_{inh}$ |
| (1) [structure: 70% / 30%] | 0.95 |

(II) 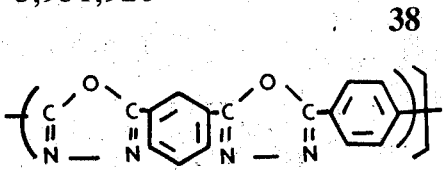 1.13
(70%) (30%)
(III) 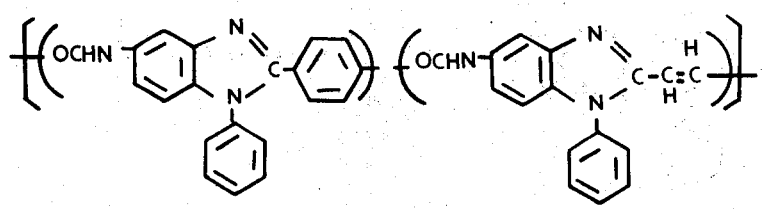 1.53
(75%) (25%)
(IV) 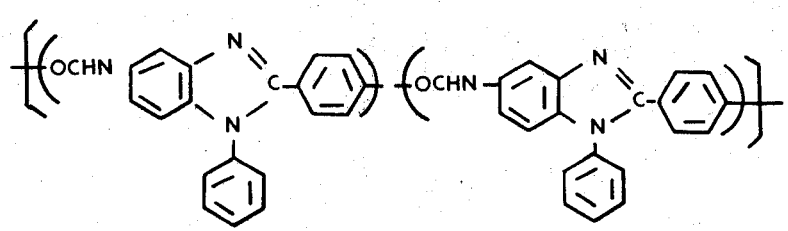 0.74
(80%) (20%)
(V) 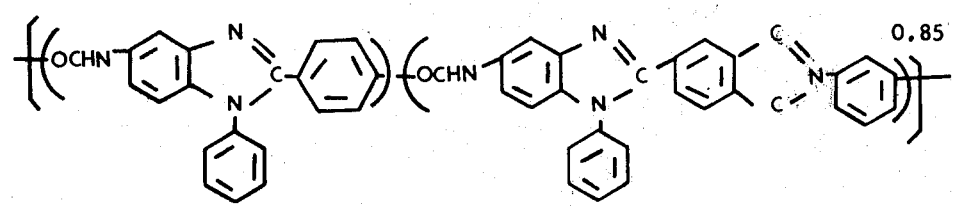 0.85
(80%) (20%)
(VI) 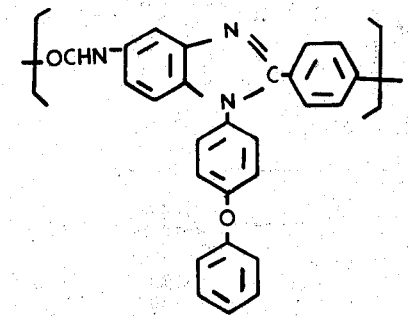 1.32

TABLE 7—Continued
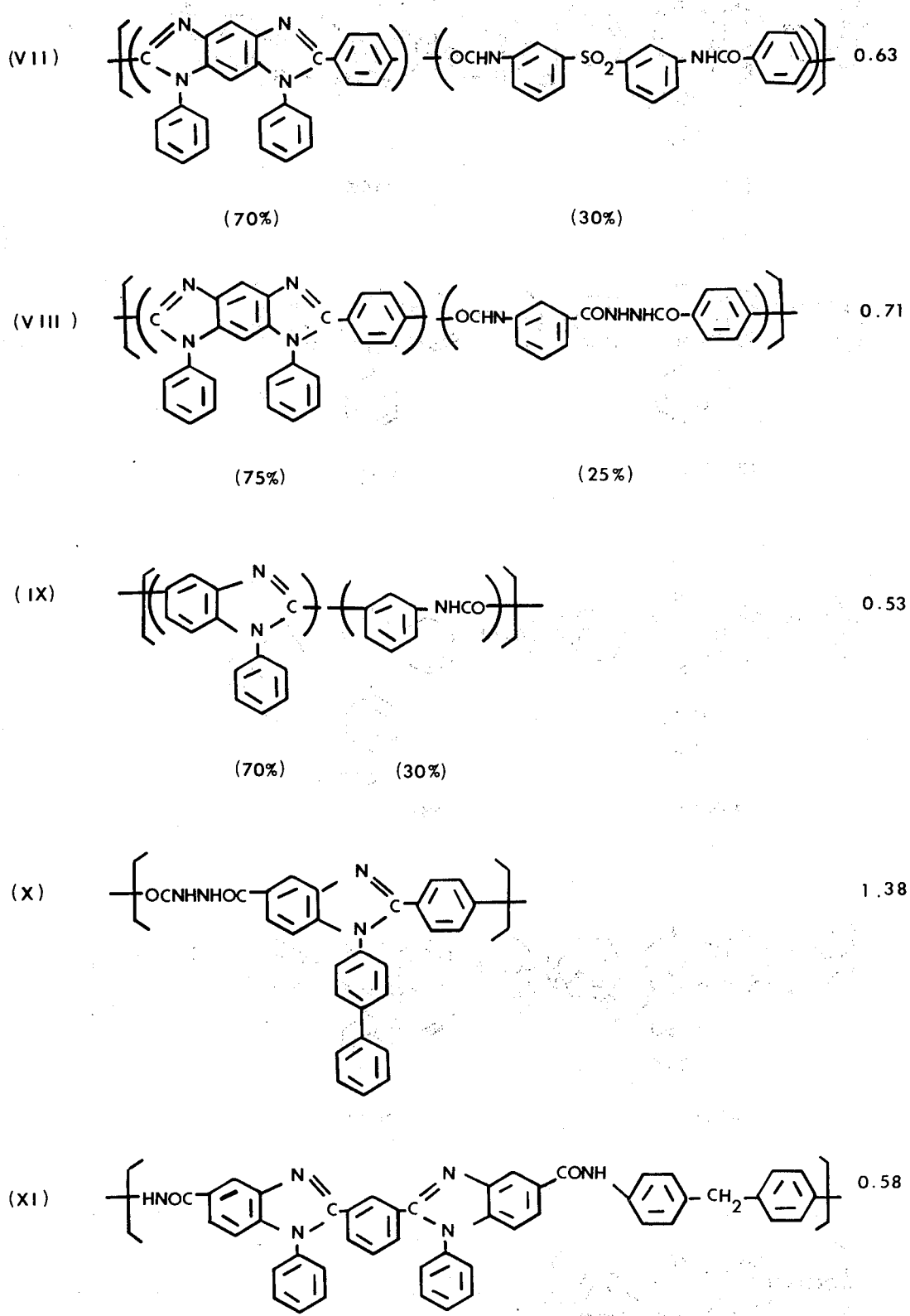
| | | |
|---|---|---|
| (VII) | (70%) / (30%) | 0.63 |
| (VIII) | (75%) / (25%) | 0.71 |
| (IX) | (70%) / (30%) | 0.53 |
| (X) | | 1.38 |
| (XI) | | 0.58 |
Table 8
| | | Polymer | | Solvent | | Additive | | Casting | Drying |
|---|---|---|---|---|---|---|---|---|---|
| Example No. | kind | Hp | amount[1] | kind[3] | amount[1] | kind | amount[1] | thickness($\mu$)[2] | °C./min. |
| 25 | (I) | 0.65 | 10 | NMP | 87 | LiCl | 3 | 320 | 130/15 |
| 26 | (II) | 0.66 | 10 | NMP | 87 | LiCl | 3 | 320 | 130/15 |
| 27 | (III) | 0.66 | 10 | NMP | 87 | LiCl | 3 | 350 | 125/17 |

Table 8-continued

| Example No. | kind | Polymer Hp | amount[1] | Solvent kind[3] | amount[1] | Additive kind | amount[1] | Casting thickness($\mu$)[2] | Drying °C./min. |
|---|---|---|---|---|---|---|---|---|---|
| 28 | (IV) | 0.69 | 15 | NMP | 79 | $CaCl_2$ | 6 | 220 | 128/16 |
| 29 | (V) | 0.65 | 10 | NMP | 87 | LiCl | 3 | 320 | 130/15 |
| 30 | (VI) | 0.55 | 10 | NMP | 87 | LiCl | 3 | 320 | 130/15 |
| 31 | (VII) | 0.59 | 18 | NMP | 75 | LiCl | 7 | 250 | 125/14 |
| 32 | (VIII) | 0.64 | 15 | NMP | 80 | $CaCl_2$ | 5 | 300 | 130/15 |
| 33 | (IX) | 0.62 | 8 | NMP | 90 | LiCl | 2 | 400 | 130/16 |
| 34 | (X) | 0.64 | 10 | NMP | 86 | $CaCl_2$ | 4 | 320 | 130/15 |
| 35 | (XI) | 0.55 | 21 | NMP | 73 | LiCl | 6 | 250 | 130/15 |

Notes:
[1] parts by weight.
[2] Casting was conducted at room temperature on a glass plate with use of a doctor knife.
[3] NMR = N-methylpyrrolidone.

Table 8

| Example No. | Water content* (%) | Membrane thickness ($\mu$) | Feed solution concentration** (%) | Pressure (kg/cm$^2$) | Water flux (l/m$^2$/hr) | Water permeability Wp | Salt rejection (%) |
|---|---|---|---|---|---|---|---|
| 25 | 69.6 | 73 | 1.0 | 80 | 38.2 | 530 | 95.7 |
| 26 | 55.7 | 64 | 1.0 | 80 | 25.2 | 350 | 89.6 |
| 27 | 62.3 | 66 | 1.0 | 80 | 42.5 | 590 | 93.8 |
| 28 | 57.4 | 53 | 1.0 | 80 | 28.8 | 400 | 71.4 |
| 29 | 58.0 | 62 | 1.0 | 80 | 20.3 | 282 | 97.9 |
| 30 | 60.3 | 65 | 1.0 | 80 | 13.5 | 187 | 99.1 |
| 31 | 65.9 | 74 | 3.5 | 100 | 24.3 | 325 | 98.8 |
| 32 | 71.0 | 85 | 1.0 | 80 | 41.2 | 570 | 94.5 |
| 33 | 51.0 | 48 | 0.5 | 80 | 17.8 | 235 | 98.6 |
| 34 | 61.5 | 62 | 1.0 | 80 | 21.3 | 296 | 92.4 |
| 35 | 50.3 | 71 | 1.0 | 80 | 13.2 | 183 | 99.5 |

Notes:

**an aqueous solution of NaCl was used as the feed solution.

What we claim is:

1. A permselective polymeric membrane comprising a substrate polymer consisting essentially of a linear polymer containing as the main structural units N-aryl-substituted-benzimidazole units wherein said linear polymer;
   1. is composed of the recurring units expressed by the following general formula (1)

$$\{A,B\} \qquad (1)$$

wherein

A is a divalent atomic group expressed by following general formula (2)

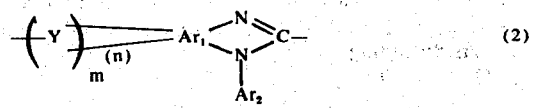

in which $m$ and $(n)$ are zero or 1, the two nitrogen atoms are bonded to two adjacent nuclear carbon atoms of the radical $Ar_1$, and $Ar_2$ is a monovalent aromatic group having up to 15 carbon atoms, and in which (i) when $(n)$ is zero, $Ar_1$ stands for a trivalent aromatic radical having up to 15 carbon atoms, Y is at least one member selected from the group consisting of -CONH-, -CONHNHCO-, -NHCONH- and

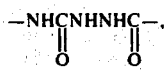

and when Y is -CONH- or

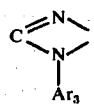

$Ar_1$ may be bonded to either of the nitrogen and carbon atoms of Y; (ii) when $(n)$ is 1, $\overline{(n)}$ indicates a single bond, $Ar_1$ is a tetravalent aromatic radical having up to 15 carbon atoms, and Y is an atomic group expressed by following formula (3)

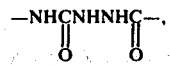

the two nitrogen atoms are bonded to the two adjacent nuclear carbon atoms of the aromatic radical $Ar_1$, and $Ar_3$ stands for a monovalent aromatic group having up to 15 carbon atoms; and (iii) the divalent atomic group expressed by above formula (2) is bonded in the polymer in either of the left and right directions;

b. B stand for a single bond or a divalent organic radical in which the average number of atoms in the polymer exclusive of hydrogen atoms is not greater than 80 and carbon atoms are located at both the terminal ends, and when B is a single bond, the recurring unit A consists of the atomic group expressed by above formula (2);

2. has the parameter (Hp) of hydrophilic property, expressed by the following formula, of at least 0.4

$$Hp = \frac{N_H + 10N_I}{\text{total number of atoms exclusive of hydrogen atoms in the polymer}} \quad (4)$$

wherein $N_H$ is the number of hydrogen-bonding units contributed by polar groups in the entire polymer and is expressed by the product of the number ($N_A$) of hydrogen-bonding groups in the entire polymer and their hydrogen-bonding strength ($G_V$); and $N_I$ is the number of ionic groups in the entire polymer, with the proviso that the number of ionic groups does not exceed 1 per 500 of the molecular weight of the polymer;

3. has a solubility of 25°C. in a solvent composed of at least one member selected from the group consisting of N,N-dimethylacetamide, N-methylpyrrolidone, dimethylsulfoxide and hexamethylphosphoramide (which solvent may contain up to 5% by weight of lithium chloride), of at least 7% by weight; and
4. has a molecular weight sufficient to form a film;

and wherein said permselective membrane has;
1. a thickness of 2–400 microns;
2. a water permeability Wp of 5 to 1300 l/m²/hour atm wherein Wp is calculated by the following formula:

$$Wp = \frac{\text{amount of permeated water (liters)}}{\text{membrane area (m}^2\text{)} \times \text{time (hr)} \times \text{pressure (atm)}} \times 10^3$$

3. and a salt rejection of at least 40% wherein said salt rejection is calculated by the following formula:

$$(\%) = \left(1 - \frac{\text{salt concentration in permeated water}}{\text{salt concentration in feed water}}\right) \times 100$$

2. A permselective polymeric membrane as set forth in claim 1, wherein the linear polymer contains as units A at least one radical expressed by the following formulae

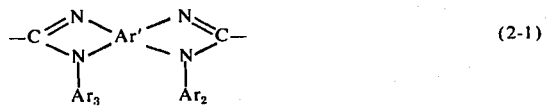  (2-1)

  (2-2)

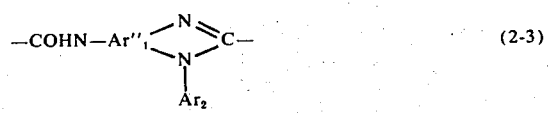  (2-3)

and

  (2-4)

wherein Ar'$_1$ and Ar''$_2$ stand for a group expressed by the following formula

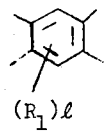  (5-a)

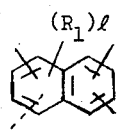  (5-b)

or

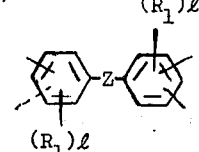  (5-c)

in which $R_1$ stands for a hydrogen or halogen atom or a lower alkyl or lower alkoxy group having 1 to 3 carbon atoms, l is 1 or 2, and Z designates a single bond or an alkylene group of up to 4 carbon atoms, —O—, —S—, —SO$_2$— or —CO— and when Z is a single bond, the formula (5-c) expresses a tri- or tetra-valent biphenyl group, and "..." on the aromatic group designates a single bond in the case of Ar'$_1$ and a hydrogen atom or a substituent $R_1$ in the case of Ar''$_1$.

3. A permselective polymeric membrane as set forth in claim 1 wherein said linear substrate polymer comprises as the units B (1) at least one divalent organic group selected from (i) aromatic hydrocarbon residues composed of a benzene or naphthalene nucleus, (ii) aliphatic hydrocarbon residues composed of a cyclohexane, cyclopentane or cyclobutane nucleus, (iii) straight or branched, saturated or unsaturated hydrocarbon residues having 1 to 6 carbon atoms and (iv) 5- or 6-membered heterocyclic residues containing oxygen, nitrogen or sulfur, which may be fused with a benzene nucleus, carbon atoms being located at both the terminal ends in said divalent organic groups; or (2) (a) at least one kind of di-, tri- or tetra-valent organic groups in which carbon atoms are located at both the terminal ends and which are selected from (i) to (iv) above and (b) said organic groups are bonded with at last one bonding group selected from —O—, —S—, —SO$_2$—, —CO—,

(in which R is a hydrogen atom an alkyl group of 1 to 3 carbon atoms or a phenyl group), -COHN- -CONHN-HOC-,

-CONHNHCOHN- and

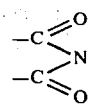

said atomic groups (1) and (2) may be substituted by a lower alkyl group of 1 to 4 carbon atoms, a lower alkoxy group of 1 to 4 carbon atoms, a halogen atom, a nitro group, a sulfonic or carboxyl group, a salt of said acid residue, a lower alkoxy carbonyl group, a primary, secondary or tertiary amino group, an ammonium salt thereof, or a quaternary ammonium base; and in the units B contained in the entire polymer, the average number of atoms exclusive of hydrogen atoms, is not greater than 80.

4. A permeselective polymeric membrane as set forth in claim 1, wherein the units A are at least one divalent group expressed by the following formula (6)

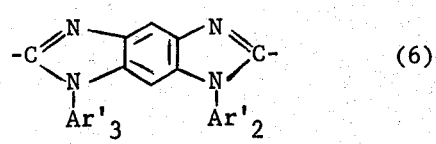
(6)

wherein $Ar'_2$ and $Ar'_3$, which may be the same or different, represent a monovalent aromatic group of up to 15 carbon atoms expressed by the formula

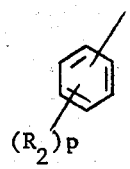
(6-1)

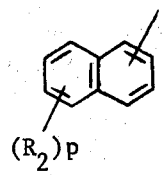
(6-2)

or

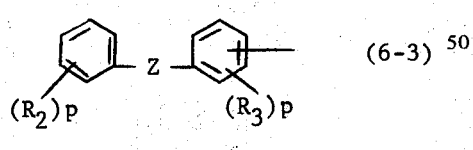
(6-3)

in which $R_2$ and $R_3$, which may be the same or different, represent a hydrogen atom, an alkyl group of 1 to 3 carbon atoms, a halogen atom, a nitro group, a sulfonic or carboxylic group or a salt thereof, p is 1 or 2, and Z designates a single bond or an alkylene group of up to 4 carbon atoms, —O—, —S—, —SO$_2$— or —CO— and when Z is a single bond, the formula (6-3) expresses a tri- or tetra-valent biphenyl group, and ". . ." on the aromatic group designates a single bond in the case of $Ar'_1$ and a hydrogen atom or a substituent $R_1$ in the case of $Ar''_1$, and the units B are at least one divalent organic group expressed by the following formula (7)

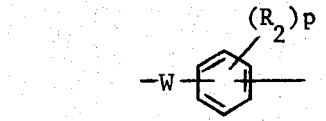
(7)

wherein $q_1$ represents an average content of the units

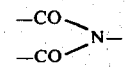

contained in the polymer and is a value of 0.2 to 3 moles per mole of the recurring units A, $R_2$ and p are as defined above with respect to the formula (6-1), and W is —COHN— (which may be located in the reverse direction), —O—, —SO—,

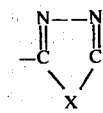

(in this case, the α or β ring is trivalent), —CONHN-HOC—, an alkylene group of 1 to 4 carbon atoms or

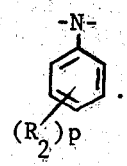

in which X designates —O—, —S—, —NH—, or

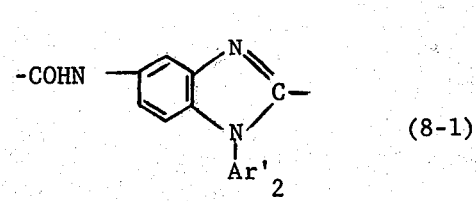

5. A permselective polymeric membrane as set forth in claim 1, wherein the units A are at least one divalent atomic group expressed by the following formula

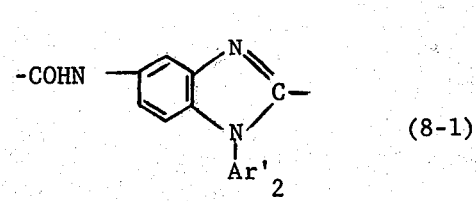
(8-1)

or

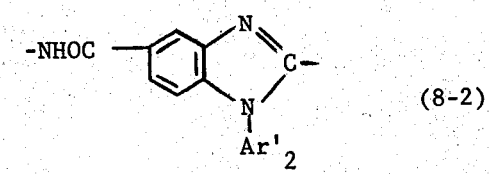
(8-2)

wherein $Ar'_2$ represents a monovalent aromatic group of up to 15 carbon atoms expressed by the formula

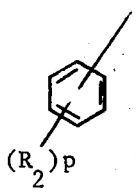 (6-1)

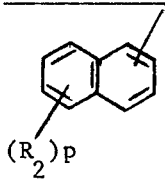 (6-2)

or

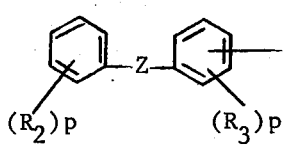 (6-3)

in which $R_2$ and $R_3$, which may be the same or different, represent a hydrogen atom, an alkyl group of 1 to 3 carbon atoms, a halogen atom, a nitro group, a sulfonic or carboxylic group or a salt thereof, p is 1 or 2, and Z is as defined with respect to the above formula (5-c), designates a single bond or an alkylene group of up to 4 carbon atoms, —O—, —S—, —SO$_2$, or —CO— and when Z is a single bond, the formula (6-3) expresses a tri- or tetra-valent biphenyl group, and ". . . " on the aromatic group designates a single bond in the case of Ar'$_1$ and a hydrogen atom or a substituent $R_1$ in the case of Ar''$_1$, and the units B are at least one atomic group expressed by the following formula (9)

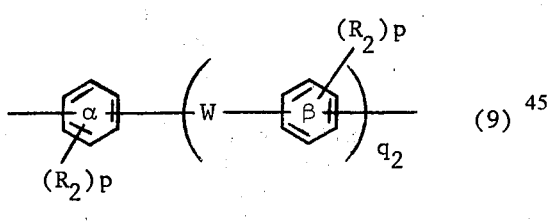 (9)

wherein $q_2$ designates the average content of the units

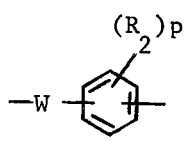

and is a value of 0 to 3 moles per mole of the recurring units A, and $R_2$ is as defined above, p is 1 or 2, and W is —CONH— (which may be located in the reverse direction, —O—, —SO—,

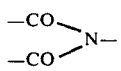

(in this case, the α or β ring is trivalent), —CONHN-HOC—, an alkylene group of 1 to 4 carbon atoms or

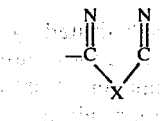

in which X designates —O—, —S—, —NH—, or

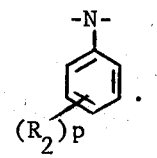

6. A permselective polymeric membrane as set forth in claim 1, wherein the units A are at least one atomic group expressed by the following formula (10)

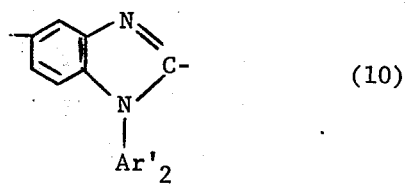 (10)

wherein Ar'$_2$ represents a monovalent aromatic group of up to 15 carbon atoms expressed by the formula

 (6-1)

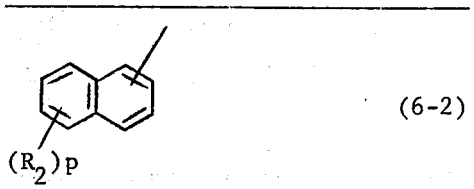 (6-2)

or

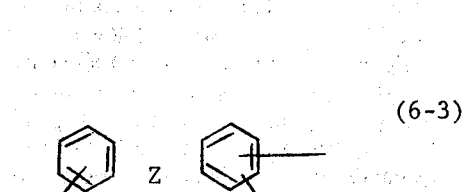 (6-3)

in which $R_2$ and $R_3$, which may be the same or different, represent a hydrogen atom, an alkyl group of 1 to 3 carbon atoms, a halogen atom, a nitro group a sulfonic or carboxylic group or a salt thereof, p is 1 or 2, and Z is as defined with respect to the above formula (5-c) designates a single bond or an alkylene group of up to 4 carbon atoms, —O—, —S—, —$SO_2$— or —CO— and when Z is a single bond, the formula (6-3) expresses a tri- or tetra-valent biphenyl group, and "..." on the aromatic group designates a single — in the case of $Ar'_1$ and a hydrogen atom or a substituent $R_1$ in the case of $Ar''_1$, and the units B are at least one atomatic group expressed by the following formula (11)

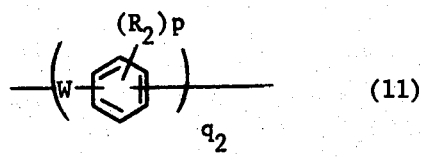

wherein $q_2$ designates the average content of the units

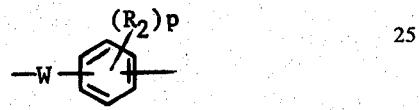

and is a value of 0 to 3 moles per mole of the recurring units A, and $R_2$ is as defined above, p is 1 or 2, and W is —CONH— (which may be located in the reverse direction, —O—, —SO—,

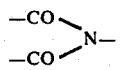

(in this case, the $\alpha$ or $\beta$ ring is trivalent), —CONHN-HOC—, and alkylene group of 1 to 4 carbon atoms or

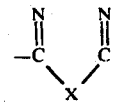

in which X designates —O—, —S—, —NH—, or

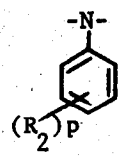

7. A process for the preparation of permselective polymeric membranes which comprises partially solidifying a solution comprising (a) a linear polymer having an N-aryl-substituted-benzimidazole structure composed of units A and B as set forth in claim 1 and (b) an aprotic polar organic solvent capable of dissolving said linear polymer therein, together with (c) a low molecular compound having a molecular weight not exceeding 500 and being soluble in both said organic solvent (b) and a non-solvent (d) for said linear polymer (a) to such an extent that the resulting partially solidified membrane has a self-sustaining property, dipping the partially solidified membrane into said non-solvent (d) for said linear polymer (a), which has compatibility with said organic solvent (b), and thereby extracting at least 75% by weight of said organic solvent (b) and low molecule compound (c) left in said partially solidified membrane.

8. The process of claim 7, wherein the solution comprising the three components (a), (b) and (c) contains the low molecule compound (c) in an amount of less than 50% by weight based on the linear polymer (a) in the state dissolved in a solution comprising 7 to 50% by weight of the linear polymer (a) and 50 to 93% by weight of the organic solvent (b).

9. The process of claim 7, wherein the partially solidified membrane having self-sustaining property, prepared from the solution comprising said components (a) and (b) together with said low molecule compound (c), is dipped in said non-solvent (d) at a temperature ranging from −20°C. to 50°C. thereby to extract at least 80% by weight each of said organic solvent (b) and said low molecule compound (c).

10. The permselective polymeric membrane of claim 1, wherein
a. $Ar_1$ is

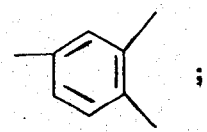

$m = 1, n = 0; Y =$ —CONH—; and $Ar_2$ is

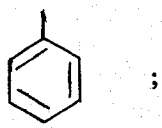

and
b. B is

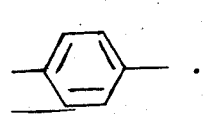

11. A process for the preparation of permselective polymeric membranes which comprises partially solidifying a solution comprising (a) a linear polymer having an N-aryl-substituted-benzimidazole structure composed of units A and B as set forth in claim 1 and (b) an aprotic polar organic solvent capable of dissolving said linear polymer therein to such an extent that the resulting partially solidified membrane has a self-sustaining property, dipping the partially solidified membrane into a non-solvent (d) for said linear polymer (a), which has compatibility with said organic solvent (b), and thereby extracting at least 75% by weight of said organic solvent (b).

12. The process of claim 11, wherein the partially solidified membrane having self-sustaining property, prepared from the solution comprising said components (a) and (b) is dipped in said non-solvent (d) at a temperature ranging from −20°C. to 50°C. thereby to extract at least 80% by weight of said organic solvent (b).

13. In a method for the selective separation of undesirable impurities from a liquid medium by reverse osmosis with a permselective membrane, the improvement comprising employing the permselective membrane set forth in claim 1.

14. The method of claim 13 wherein said undesirable impurity is NaCl and said liquid medium is water.

* * * * *

UNITED STATES PATENT AND TRADEMARK OFFICE
CERTIFICATE OF CORRECTION

PATENT NO. : 3,951,920
DATED : April 20, 1976
INVENTOR(S) : Masao Senoo, et al

Page 1 of 2

It is certified that error appears in the above-identified patent and that said Letters Patent are hereby corrected as shown below:

Claim 1, line 10, before "A" insert -- a. --

Claim 2, delete formula (2-1) in its entirety and insert:

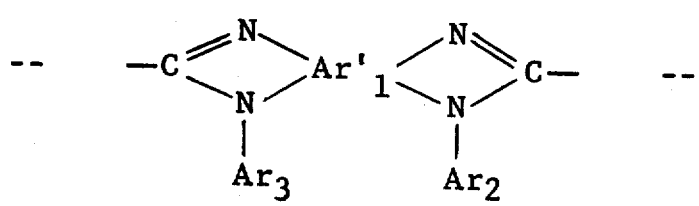

Claim 2, delete formula (2-4) in its entirety and insert:

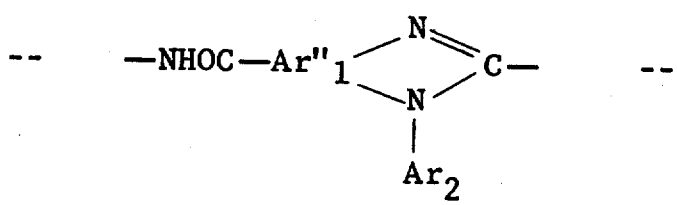

Claim 2, column 44, line 1, delete "Ar"$_2$", insert -- Ar"$_1$ --

Claim 2, column 44, line 25, delete "1 is", insert -- $\ell$ is --

Claim 3, line 18, delete "last", insert -- least --

Claim 4, column 46, line 21, delete "—COHN—", insert -- —CONH— --

Claim 5, column 47, line 34, delete "—SO$_2$,", insert -- —SO$_2$—, --

UNITED STATES PATENT AND TRADEMARK OFFICE
CERTIFICATE OF CORRECTION

PATENT NO. : 3,951,920
DATED : April 20, 1976
INVENTOR(S) : Masao Senoo, et al

It is certified that error appears in the above-identified patent and that said Letters Patent are hereby corrected as shown below:

Claim 5, column 48, line 10, delete the formula in its entirety.

Claim 6, column 49, line 3, after "group" insert -- , --

Claim 6, column 49, line 12, delete "atomatic", insert -- atomic --

Signed and Sealed this

Twenty-fourth Day of August 1976

[SEAL]

Attest:

RUTH C. MASON
*Attesting Officer*

C. MARSHALL DANN
*Commissioner of Patents and Trademarks*